Sept. 12, 1967  S. A. MENCACCI ET AL  3,340,791
HYDROSTATIC COOKER WITH HORIZONTAL PROCESSING CHAMBER
Filed Feb. 25, 1966  13 Sheets-Sheet 1
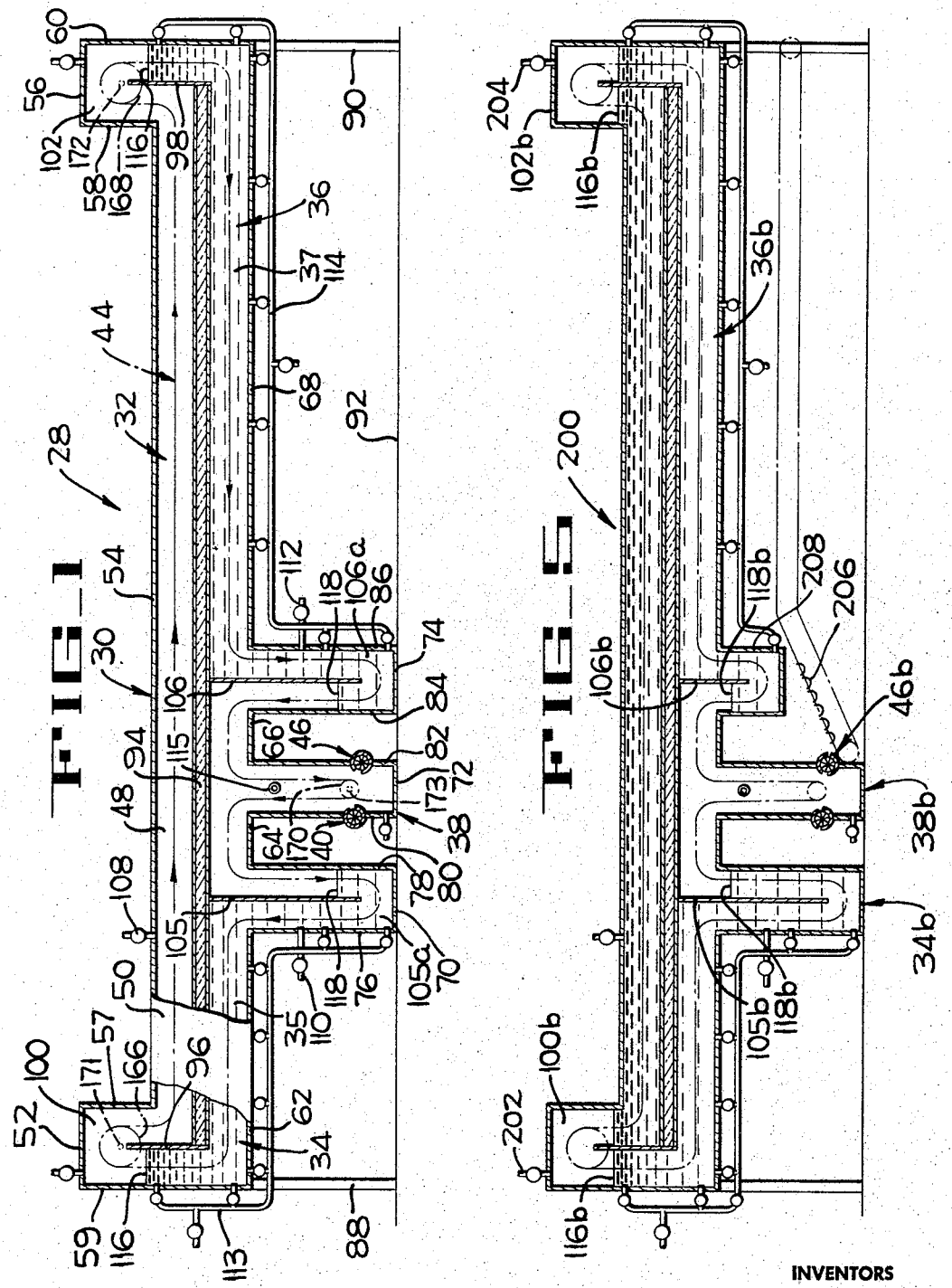
INVENTORS
SAMUEL A. MENCACCI
JOHN G. HAGERBORG
BY Francis W. Anderson
ATTORNEY Sept. 12, 1967  S. A. MENCACCI ET AL  3,340,791
HYDROSTATIC COOKER WITH HORIZONTAL PROCESSING CHAMBER
Filed Feb. 25, 1966  13 Sheets-Sheet 2
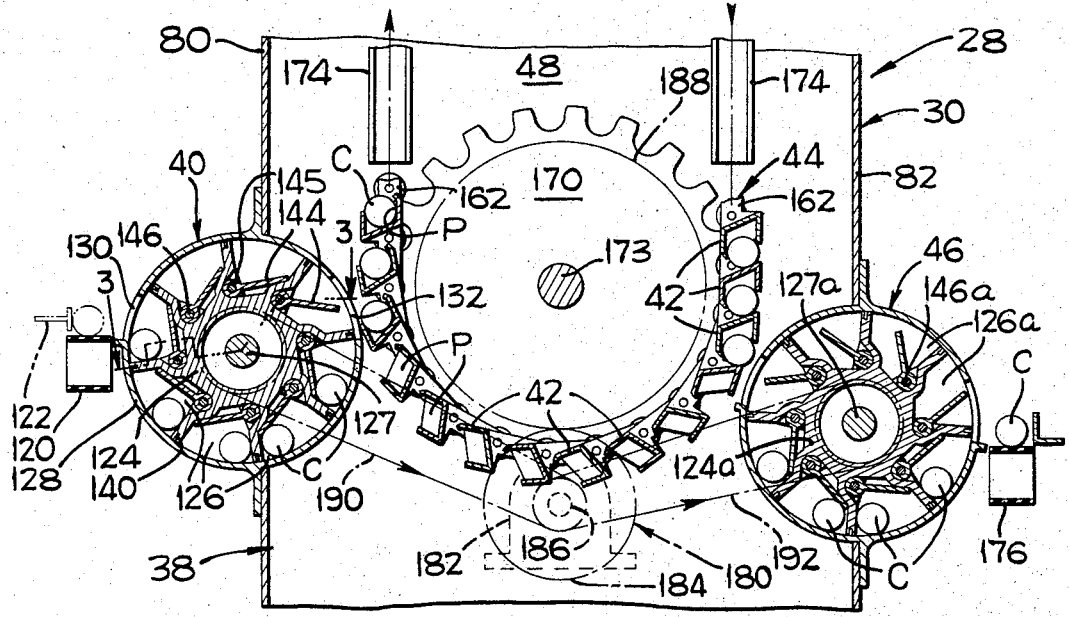
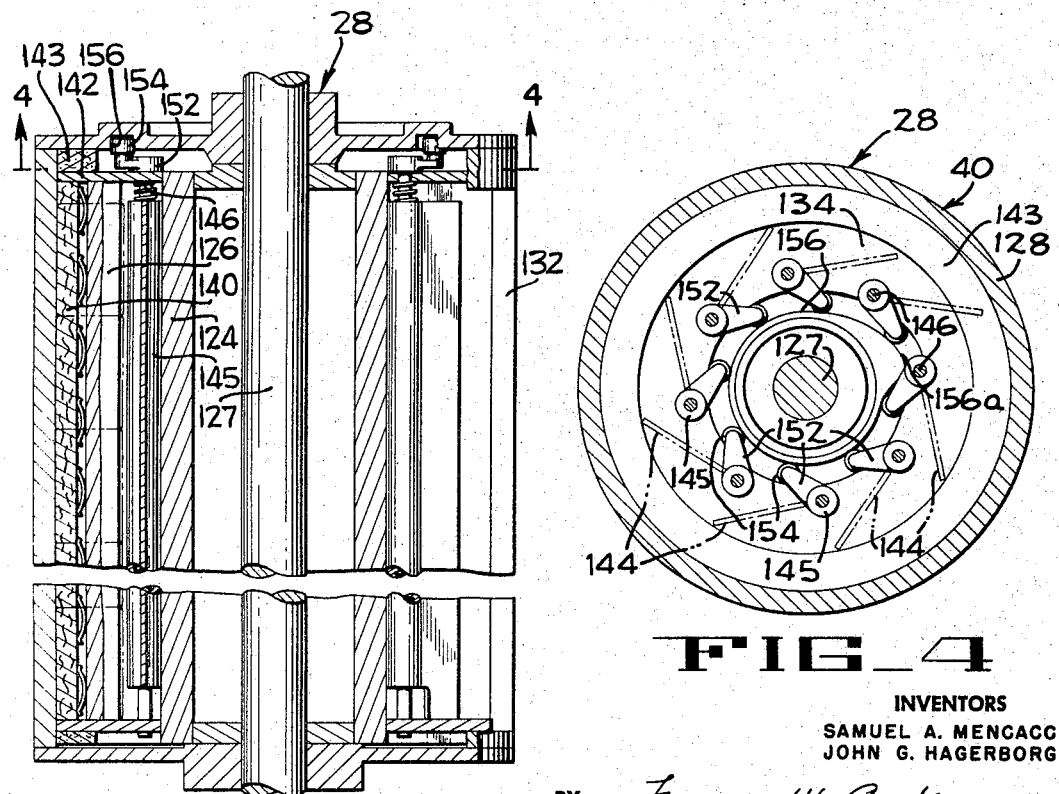
INVENTORS
SAMUEL A. MENCACCI
JOHN G. HAGERBORG
BY Francis W. Anderson
ATTORNEY

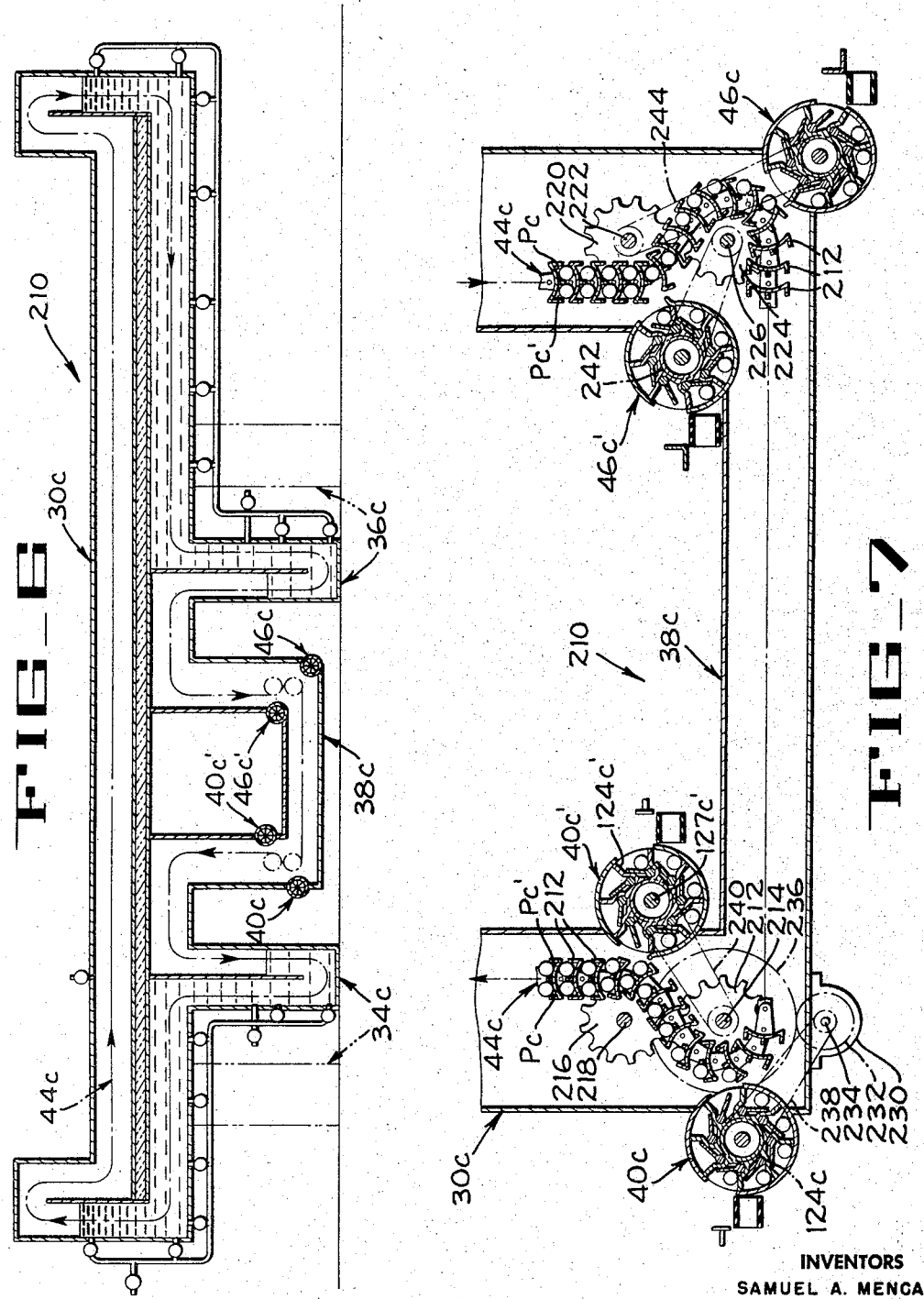

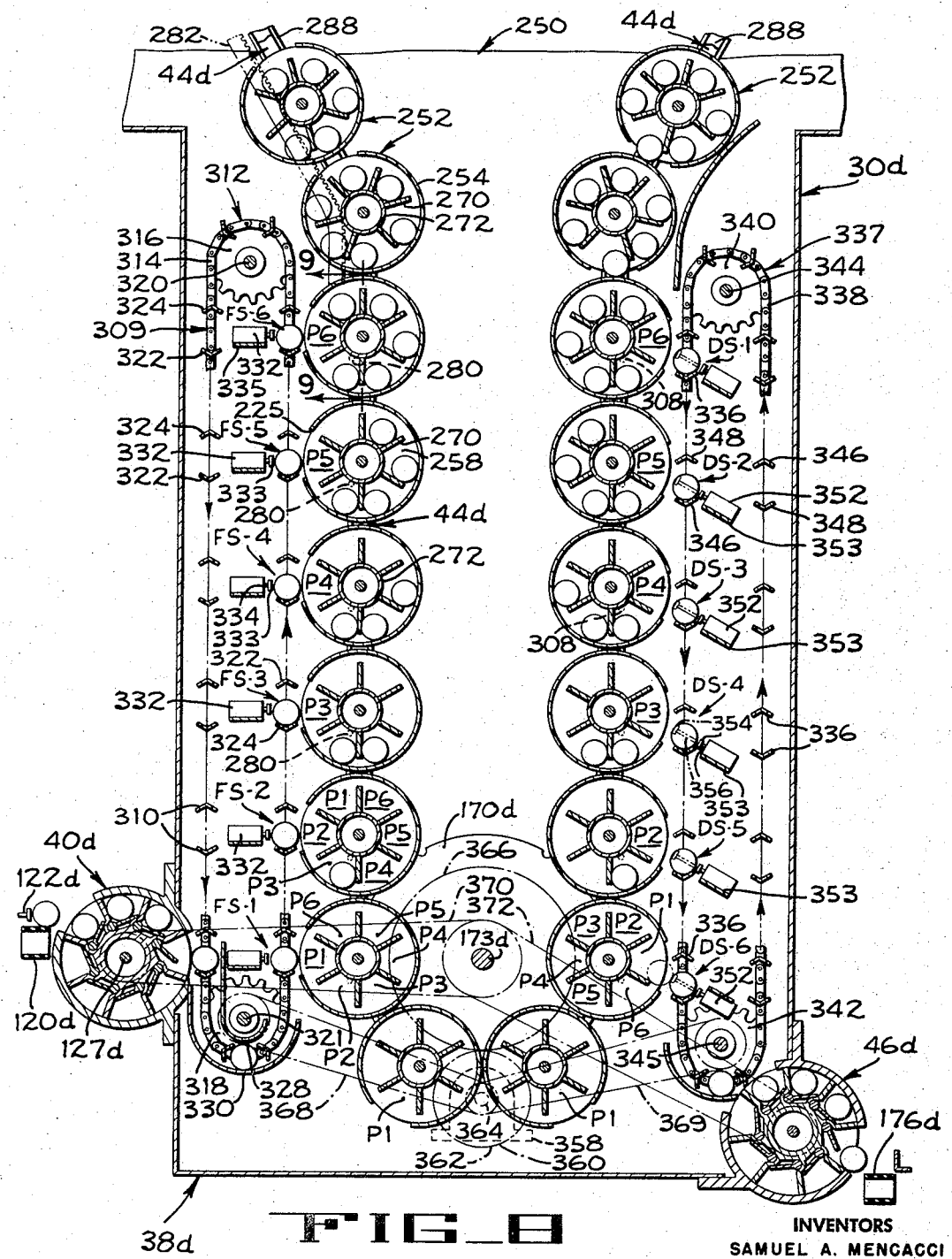

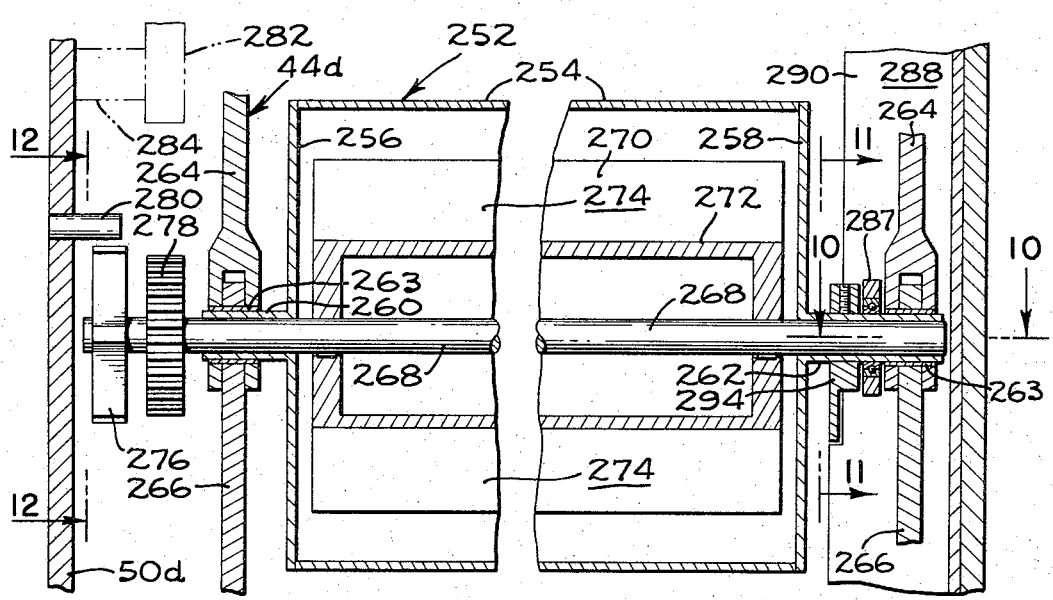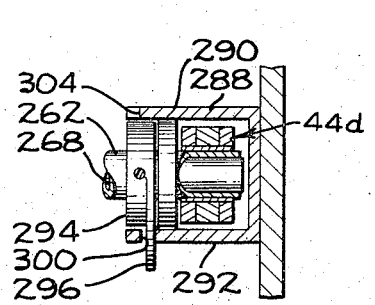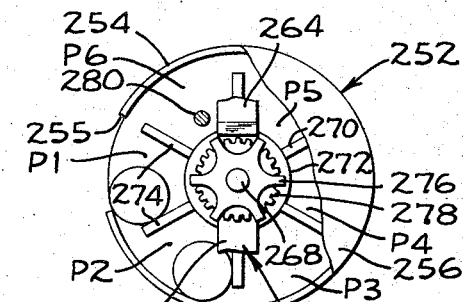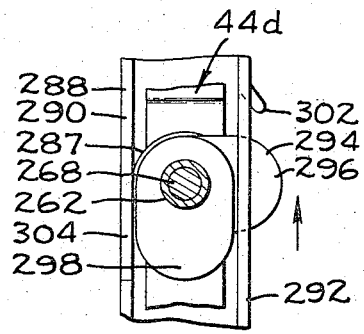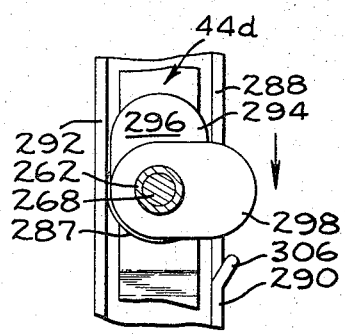
INVENTORS
SAMUEL A. MENCACCI
JOHN G. HAGERBORG
BY Francis W. Anderson
ATTORNEY

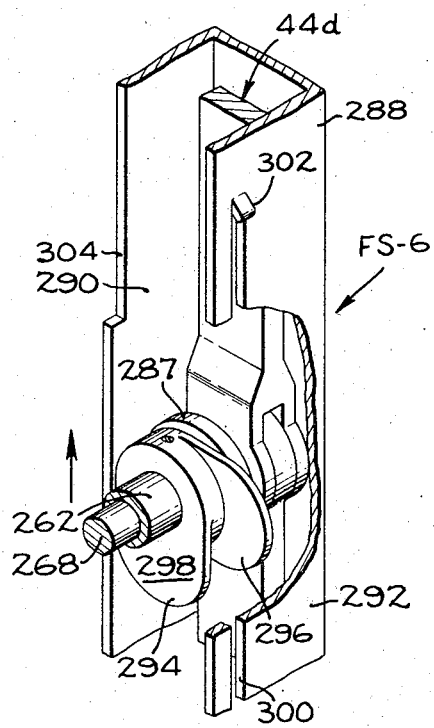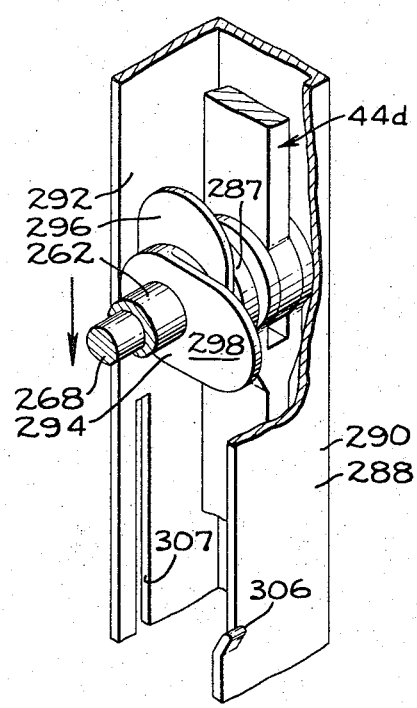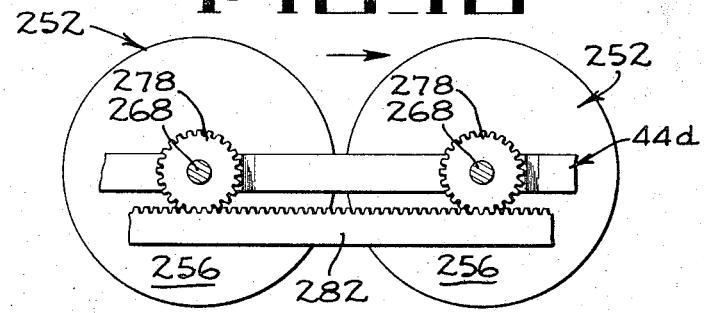

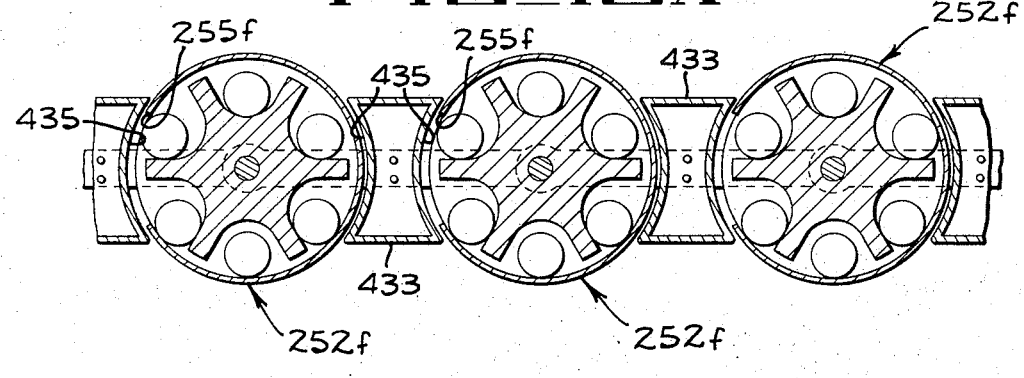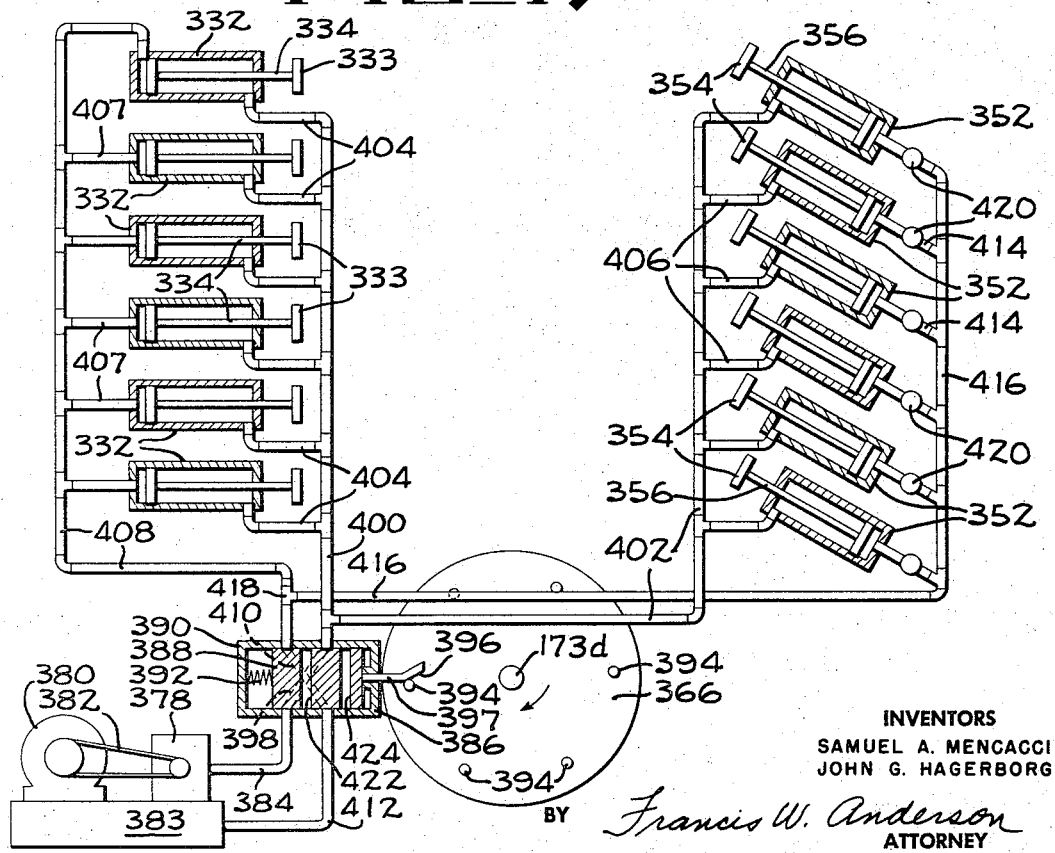

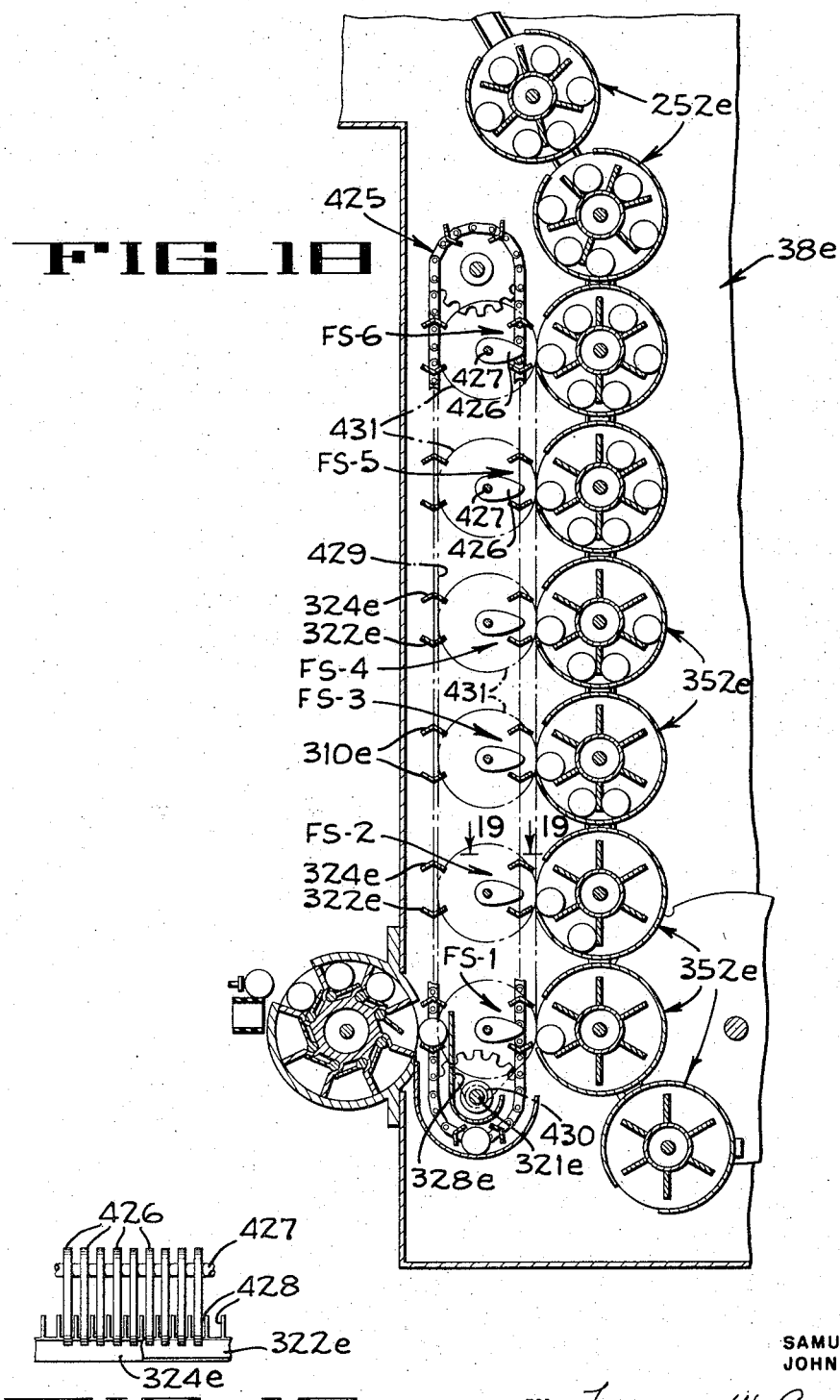

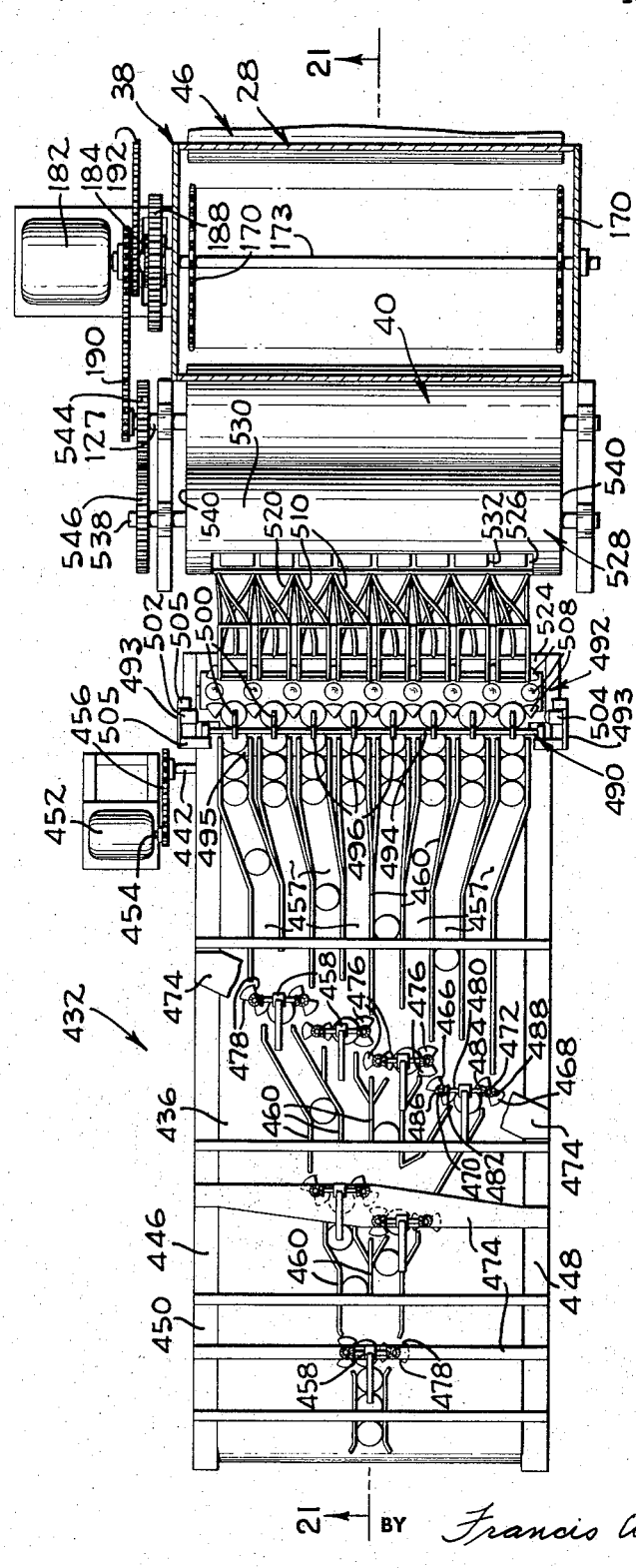

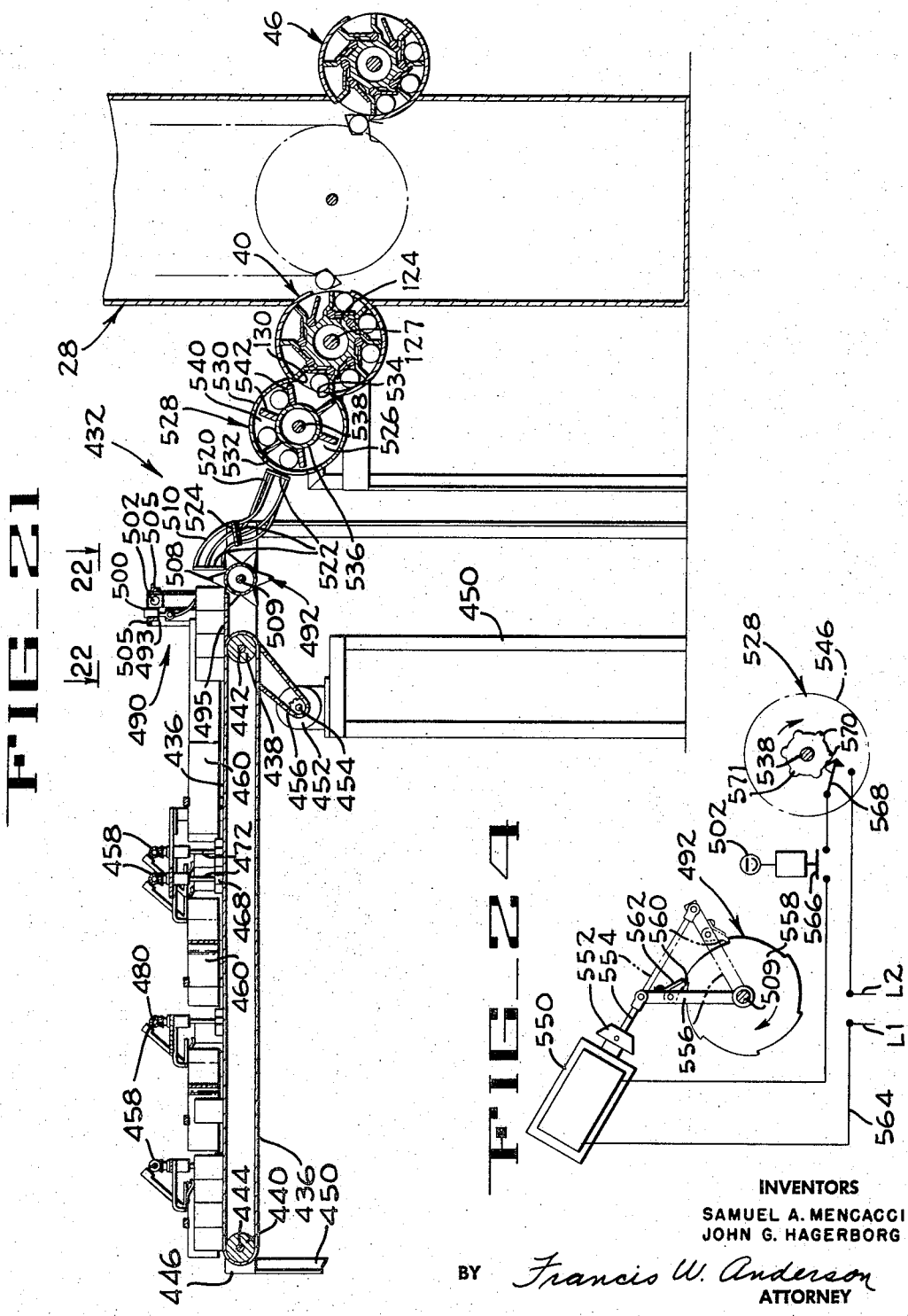

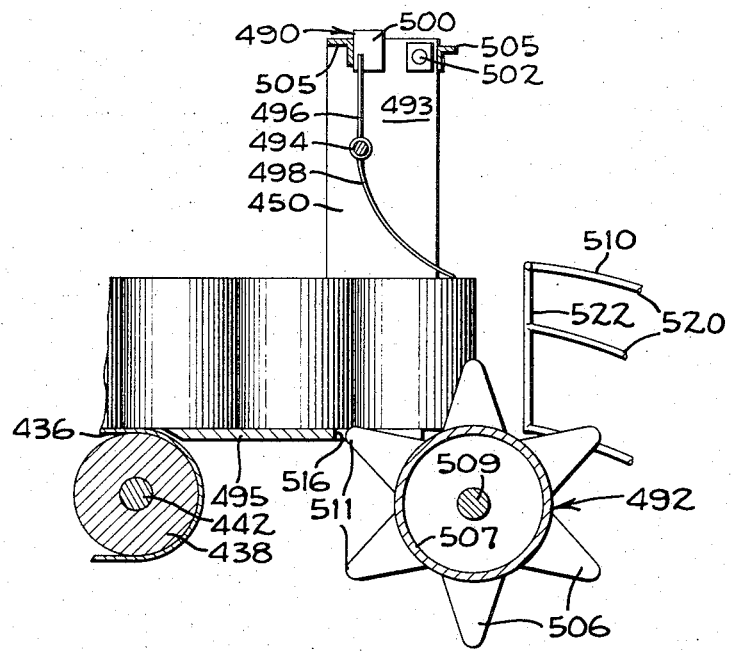
FIG_23
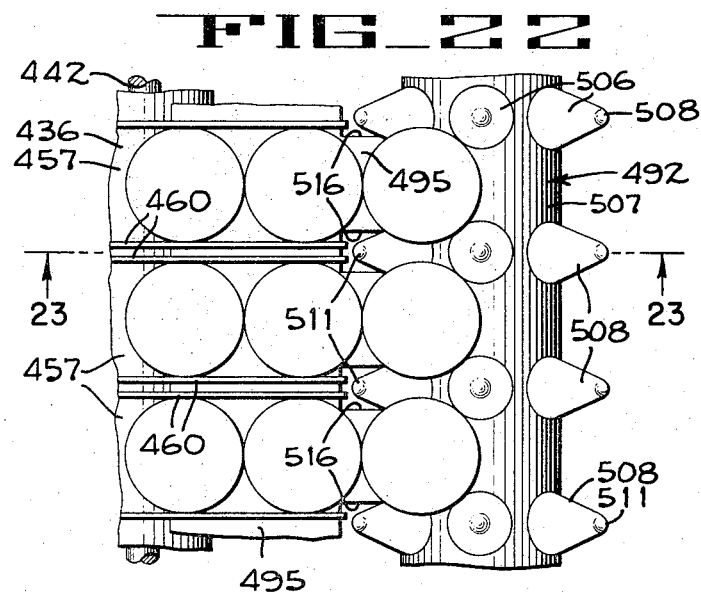
FIG_22

Sept. 12, 1967 S. A. MENCACCI ET AL 3,340,791
HYDROSTATIC COOKER WITH HORIZONTAL PROCESSING CHAMBER
Filed Feb. 25, 1966 13 Sheets-Sheet 12

INVENTORS
SAMUEL A. MENCACCI
JOHN G. HAGERBORG
BY *Francis W. Anderson*
ATTORNEY

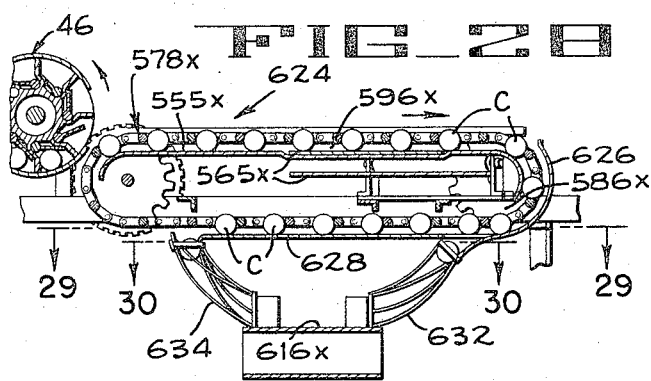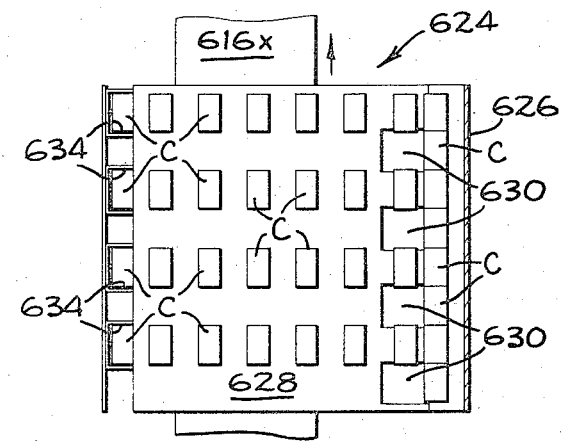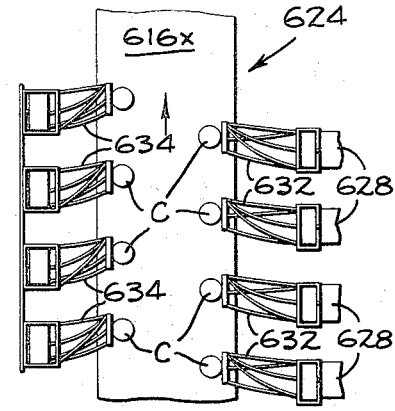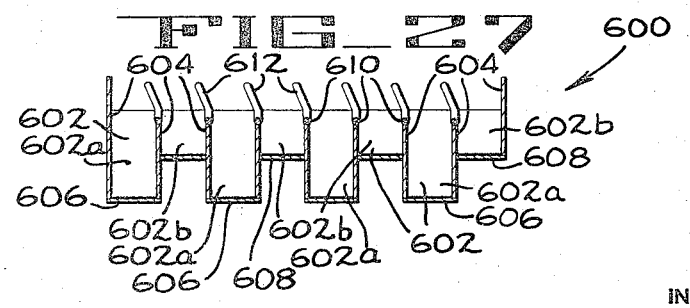

United States Patent Office 3,340,791
Patented Sept. 12, 1967

3,340,791
HYDROSTATIC COOKER WITH HORIZONTAL
PROCESSING CHAMBER
Samuel A. Mencacci, Antwerp, and John G. Hagerborg, St. Niklaas-Waas, Belgium, assignors to International Machinery Corporation S.A., St. Niklaas-Waas, Belgium, a Belgian corporation
Filed Feb. 25, 1966, Ser. No. 530,191
26 Claims. (Cl. 99—362)

The present invention pertains to an apparatus for processing products in sealed containers and more particularly relates to a low head hydrostatic cooker with overriding air pressure for processing filled and sealed containers such as glass jars.

Known hydrostatic cookers which process containers in steam at temperatures in the range of 250° F. to 275° F. require water-filled hydrostatic pre-heating and cooling housings or legs which are 60 to 70 feet tall. These housings must be even taller if it is necessary to apply an additional pressure to the external surfaces of the containers to prevent the pressure generated within the containers from exceeding the pressure acting on the external surfaces of the containers and thereby damaging the containers.

It will be appreciated that hydrostatic water filled housings or legs of such heights have several disadvantages. Such housings are expensive to build since each housing must be capable of supporting the structural weight of the housing itself as well as being capable of resisting the pressure exerted by the column of water in the housing. Another disadvantage of tall housings is that the chains of the processing conveyor must be excessively strong in order to support the weight of the containers, as well as the weight of the container carriers, because the long vertical run of the conveyor passing through the housing is supported only at the upper ends thereof. Other disadvantages of this type of cooker are that very little control can be exercised over the length of the columns of water in the hydrostatic preheating and cooling chambers since these lengths are determined by the operating pressure in the sterilizing chamber of the cooker. Also, it is difficult to control the temperature of the water in the hydrostatic housings because the hot liquid tends to rise in the vertical housings toward the low pressure upper ends thereof. Another disadvantage of excessively tall housings is that the conveyor length must be excessive if it is desired to feed and discharge containers therefrom at a convenient elevation relative to the floor.

It is, therefore, one object of the present invention to provide a cooker having short hydrostatic legs subjected to an overriding air pressure and arranged to process containers under high pressures and temperatures.

Another object is to provide a hydrostatic cooker utilizing a high pressure sterilizing medium and an overriding air pressure to maintain the proper pressure stability within the cooker and within the containers moving through the cooker.

Another object is to provide a hydrostatic cooker having a high pressure sterilizing medium acting on the upper ends of hydrostatic water legs and having air under pressure acting on the lower ends of the hydrostatic legs so as to maintain proper pressure stability within the cooker.

Another object is to provide a hydrostatic cooker having hydrostatic water legs wherein the water is maintained at a high temperature at the upper ends of the legs and is maintained at a low temperature at the lower ends.

Another object is to provide a hydrostatic cooker having hydrostatic legs with horizontal portions which may be lengthened or shortened to vary the processing time without affecting the pressure within the cooker.

Another object is to provide a hydrostatic cooker having water filled horizontal pre-heating and cooling chambers whereby the temperature within the horizontal chambers may be easily varied to achieve the most desirable temperatures for the particular products being handled.

Another object is to provide a rotary pressure valve for directing containers into carrier pockets of an endless conveyor moving within a high pressure air chamber without excessive loss of pressure from the chamber.

Another object is to provide a feed system for introducing glass containers into hydrostatic cookers.

Another object is to provide a discharge system for discharging rows of glass containers from hydrostatic cookers.

These and other objects and advantages of the present invention will become apparent from the following description and the accompanying drawings, in which:

FIGURE 1 is a diagrammatic vertical central section showing a first embodiment of the hydrostatic cooker of the present invention.

FIGURE 2 is an enlarged vertical section of a portion of the apparatus of FIGURE 1 showing a rotary pressure feed valve and a rotary pressure discharge valve.

FIGURE 3 is a horizontal section taken along lines 3—3 of FIGURE 2.

FIGURE 4 is a vertical section taken along lines 4—4 of FIGURE 3.

FIGURE 5 is a diagrammatic vertical central section similar to FIGURE 1 but illustrating a cooker utilizing a hot water sterilizing medium and having hydrostatic housings of different heights, said view being on the sheet containing FIGURE 1.

FIGURE 6 is a diagrammatic vertical central section similar to FIGURE 1 but illustrating a processing conveyor having carriers thereon adapted to handle double rows of containers, and illustrating means for varying the lengths of the pre-heating and cooling water chambers.

FIGURE 7 is an enlarged vertical section illustrating a feed and discharge system for the apparatus of FIGURE 6.

FIGURE 8 is a vertical central section taken through the air chamber of a cooker illustrating agitating carriers and mechanisms for feeding rows of containers into and discharging processed rows of containers out of the carriers.

FIGURE 9 is an enlarged vertical section taken along lines 9—9 of FIGURE 8 illustrating one of the agitating carriers.

FIGURE 10 is a horizontal section taken along lines 10—10 of FIGURE 9.

FIGURE 11 is a vertical section taken along lines 11—11 of FIGURE 9.

FIGURE 12 is a vertical section taken along lines 12—12 of FIGURE 9 illustrating the structure for rotating the carrier rotors.

FIGURE 13 is a horizontal section of a drum shifting device similar to FIGURE 11 but illustrating the device when moving downwardly into a discharge zone and with the parts being in a different operative position.

FIGURE 14 is a perspective of the drum shifting device when in the FIGURE 11 position.

FIGURE 15 is a perspective of the drum shifting device when in the FIGURE 13 position.

FIGURE 16 is a vertical section illustrating a pair of agitating carriers moving along a horizontal path and showing the structure for supporting one end of the carriers and causing rotation of the containers therein.

FIGURE 17 is a hydraulic diagram for controlling the feeding of rows of containers into the agitating carriers and discharging rows of containers from the carriers.

FIGURE 18 is a vertical central section illustrating a modified feed mechanism for feeding rows of articles into the agitating carriers.

FIGURE 18A is a central section illustrating a smaller agitating carrier which may be substituted for the carrier illustrated in FIGURE 18.

FIGURE 19 is a horizontal section taken along lines 19—19 of FIGURE 18.

FIGURE 20 is a plan with certain parts cut away of a feed mechanism for gently handling and directing containers such as glass jars into a hydrostatic cooker, a portion of the cooker being shown in section.

FIGURE 21 is a vertical central section taken along lines 21—21 of FIGURE 20.

FIGURE 22 is an enlarged plan taken along lines 22—22 of FIGURE 21.

FIGURE 23 is a vertical section taken along lines 23—23 of FIGURE 22.

FIGURE 24 is a diagrammatic illustration of a wiring diagram and of an actuating mechanism for the apparatus of FIGURE 23.

FIGURE 25 is a plan illustrating a discharge mechanism for gently handling containers such as glass jars.

FIGURE 26 is a vertical section taken along lines 26—26 of FIGURE 25.

FIGURE 27 is a vertical transverse section taken along lines 27—27 of FIGURE 26.

FIGURE 28 is a vertical section similar to FIGURE 26 showing a modified discharge mechanism.

FIGURE 29 is a horizontal section taken along lines 29—29 of FIGURE 28.

FIGURE 30 is a horizontal section taken along lines 30—30 of FIGURE 28.

In general, the hydrostatic cooker 28 (FIGS. 1 to 4) of the first embodiment of the invention comprises a pressurized housing 30 (FIG. 1) which includes a sterilizing chamber 32, a water filled inlet or pre-heating hydrostatic leg or housing 34 having a horizontal pre-heating chamber 35, an outlet or cooling leg or housing 36 filled with cooling water and having a horizontal cooling chamber 37, and a high pressure air chamber 38 disposed therebetween. Rows of containers C (FIG. 2), such as glass jars, are moved into the air chamber 38 through a rotary pressure feed valve 40 which directs the rows of containers into pockets P defined by carrier bars 42 of a continuously driven conveyor 44. The conveyor 44 then carries the containers out of the air chamber into and through the water filled pre-heating hydrostatic housing 34, through the sterilizing chamber 32 which is filled with high pressure steam, through the water filled cooling hydrostatic housing 36, and returns the processed containers to the air chamber 38 for discharge from the air chamber through a rotary discharge pressure valve 46.

More particularly, the housing 30 (FIG. 1) comprises vertical side walls 48 and 50, top walls 52, 54 and 56 which define portions of the sterilizing chamber 32, short vertical walls 57 and 58, vertical end walls 59 and 60, bottom walls 62, 64, 66 and 68, floor plates 70, 72 and 74 and vertical walls 76, 78, 80, 82, 84 and 86. The above-mentioned walls and plates are secured together in fluid tight engagement in the positions illustrated in FIGURE 1. Several pairs of legs, such as legs 88 and 90, are secured to the bottom walls 62 and 68, respectively, and cooperate with the vertical walls 76, 78, 80, 82, 84 and 86 to support the housing 30 upon a floor indicated by the line 92.

An elongated insulated horizontal partition 94 extends substantially the full length of the housing 30 and is rigidly secured in fluid tight engagement to the side walls 48 and 50 at a point substantially midway between the top wall 54 and the bottom walls 62 and 68. Vertically extending partitions 96 and 98 are secured to the ends of the horizontal partition 94 and project upwardly into steam locks 100 and 102, respectively. As clearly illustrated in FIGURE 1 the vertical partitions 96 and 98 enter the steam locks 100 and 102, respectively, a sufficient distance to prevent flow of water into the steam chamber 32 and at the same time prevents unobstructed movement of the conveyor 44 through the housing 30.

A downwardly projecting inlet partition 105 is secured in fluid tight relation to the horizontal partition 94 and to the side walls 48 and 50 and enters the inlet hydrostatic housing 34 between the vertical walls 76 and 78 a sufficient distance to define a substantially U-shaped flow passage 105a between the walls 76 and 78 through which the conveyor 44 freely passes. Similarly, a downwardly projecting discharge partition 106 is secured in fluid tight relation to the horizontal partition 94 and to the side walls 48 and 50 and enters the discharge hydrostatic housing 36 between the walls 84 and 86 to define a U-shaped passages 106a through which the conveyor 44 advances the processed containers.

As illustrated in FIGURE 1, steam or a steam-air mixture under high pressure and temperature is directed into the steam chamber 32 through a valved conduit 108 and is retained within the steam chamber, which includes the steam locks 100 and 102, by the upper surfaces of the water in the hydrostatic inlet housing 34 and in the hydrostatic discharge housing 36. Water entering the inlet housing 34 through a valved conduit 110 fills the hydrostatic leg and supplies any additional water which may be needed from time to time. Similarly, a valved conduit 112 is provided to direct cooling water into the discharge hydrostatic housing 36 to fill the same and provide make-up water during processing if necessary. A valved steam manifold 113 is provided with outlets communicating with and spaced along said inlet housing 34 so as to preheat the water therein thereby providing a gradually increasing water temperature from the inlet end of the inlet housing to the discharge end thereof. A valved water discharge manifold 114 is provided with outlets communicating with and spaced along the cooling housing 36 so as to drain heated water from the cooling housing 36 and maintain a temperature gradient therein which gradually decreases in temperature from the inlet end thereof to the discharge end thereof.

High pressure air is directed into the air chamber 38 through a valved conduit 115 and is maintained at a pressure which is in excess of the pressure within the steam chamber by an amount equal to the pressure imparted by the unbalanced columns of water in the hydrostatic housings between the upper surface of the water indicated by lines 116 and the lower surfaces indicated by the lines 118. Thus, it will be seen that the maximum pressure applied to the containers as they pass through the cooker 28 occurs when the containers are in the air chamber 38.

The rotary pressure feed valve 40 (FIGS. 2, 3 and 4) receives rows of containers C that are pushed off a continuously driven feed conveyor 120 by a pusher 122 operated in timed relation with the movement of the conveyor 44 in a well known manner. The feed valve 40 comprises a rotor 124 having a plurality of elongated container receiving pockets 126 formed in its periphery. The rotor 124 is rigidly secured to a shaft 127 and rotates within a cylindrical housing 128 having an elongated inlet opening 130 and an elongated discharge opening 132 formed in the periphery thereof. End plates 134 and 136 are bolted to the housing 128 and rotatably mount the shaft 127 of the rotor 124. The portion of the rotor 124 between the pockets 126 are provided with packing strips 140 which are urged into sealing engagement against the inner peripheral surface of the housing 128 by leaf springs 141. Each end wall 142 of the rotor 124 is likewise sealed against the adjacent end plates 134 and 136 by packing rings 143. Thus, each pocket 126 is sealed in fluid tight engagement with the housing 128 except during the time when the pockets are moving past the inlet opening 130 or the discharge opening 132.

In order to positively discharge each row of containers from their associated pockets 126 through the discharge opening 132 and into a pocket P of an associated carrier 42 of the conveyor 44, an ejector plate 144 (FIGS. 2, 3 and 4) is pivotally mounted in each pocket 126. Each ejector plate is welded to a tubular sleeve 145 that is rigidly secured to a shaft 146 which is journalled in the end walls 142 of the rotor 124. One end of a lever 152 is rigidly secured to a portion of the shaft 146 which projects outwardly from one of the walls 142. A cam follower 154 is journalled on the other end of the lever 152 and rides in a cam groove 156 formed in the end plate 134. The cam groove 156 (FIG. 4) is shaped so that each ejector plate 144 remains retracted within the pocket 126 until the pocket moves past the discharge opening 132 at which time the cam follower 154 moves into a large diameter portion 156a of the groove 156 causing the ejector plate 144 in each pocket to move outwardly to the extended position thereby forcing the row of containers in each pocket through the discharge opening 132 into a pocket P of a carrier bar 42 of the processing conveyor 44.

The processing conveyor 44 is of a conventional design having a pair of spaced endless chains 162 (only one chain being shown) with carrier bars 42 evenly spaced thereon and connected to associated links of the chains. The chains 162 are trained around pairs of sprockets 166, 168 and 170 disposed within the steam lock 100, the steam lock 102 and the air chamber 138, respectively. The pairs of sprockets 166, 168 and 170 are keyed to shafts 171, 172 and 173, respectively, which shafts are journalled in the side walls 48 and 50 of the housing 30. Channel-shaped chain tracks 174 (only a portion of the tracks being shown in FIGURE 2) are rigidly secured to the side walls 48 and 50 and cooperate with the sprockets 166, 168 and 170 to engage and guide the chains 162 of the conveyor 44 along a path in the direction indicated by the arrows in FIGURE 1. It will be noted that the sprockets 170 have a small radius which causes the carriers 42 when moving therepast to deflect sufficiently to permit the rows of containers C to be fed into or discharged from the carriers. The radii of the sprockets 166 and 168, and the radii of the several curved portions of the tracks 174 are equal to or are greater than twice the radius of sprocket 170 which larger radius is sufficient to prevent discharge of the rows of containers from the carrier bars 42.

The discharge pressure valve 46 is similar to feed valve 40 and accordingly will not be described in detail. Parts of the discharge valve 46 which are equivalent to the feed valve 40 will be assigned the same numeral followed by the letter "a." It will be noted that the ejector shafts 146a of the discharge valve 46 are mounted adjacent the trailing walls of the pockets 126a of the discharge valve 46, rather than adjacent the upstream or leading wall of the pockets 126 as in the feed valve 40, thereby more gently receiving the containers from carrier pockets P and more effectively pushing the rows of processed containers C out of the pockets 126a. The rows of processed containers which are discharged from the valve 46 are received on a continuously driven endless discharge conveyor 176 and are conveyed away from the hydrostatic cooker 28 to other container handling equipment (not shown).

As best illustrated in FIGURE 2, the feed valve rotor 124, the discharge valve rotor 124a, and the processing conveyor 44 are driven by a drive train 180 which receives its power from a gear motor 182. The motor 182 has a pinion 184 secured to its drive shaft 186, and the pinion 184 meshes with a large diameter gear 188 that is keyed to the shaft 173 thereby driving the conveyor 44 in the direction of the arrows in FIGURE 2. The rotor 124 of the feed valve 40 is driven in timed relation with the conveyor 44 by a chain drive 190 which interconnects the motor drive shaft 186 and the shaft 127 of the rotor 124. A similar chain drive 192 interconnects the motor drive shaft 186 and the shaft 127a of the rotor 124a of the rotary discharge valve 46.

In the operation of the hydrostatic cooker 28 of the first embodiment of the invention for processing containers such as glass jars filled with baby food, steam or a steam-air mixture at approximately 250° F. and 15 p.s.i. gauge is directed into the steam chamber through the steam conduit 108 (FIG. 1). Water is directed into the hydrostatic inlet housing 34 through the conduit 110, and into the discharge hydrostatic housing 36 through the conduit 112. The desired temperature gradient in the inlet housing 34 is retained by steam entering the chamber through the manifold 113, while the desired temperature in the discharge housing 36 is controlled by the manifold 114. High pressure air is directed into the air chamber 38 through the conduit 115 at a pressure of approximately 20 p.s.i. gauge thereby providing a sufficient overriding pressure to balance the combined force exerted by the steam and the force exerted by the unbalanced columns of water in the hydrostatic chambers, i.e., the columns of water having their upper levels at 116 and their lower levels at 118. These columns of water may be on the order of 10 to 12 feet in height thereby adding approximately 5 p.s.i. gauge water pressure to the approximately 15 p.s.i. gauge steam pressure which must equal the pressure of air within the air chamber 38.

Rows of containers are then intermittently formed on the feed conveyor 120 (FIG. 2) and are directed into the pockets 126 of the rotary feed valve 40 which transfers the rows of containers into the carrier pockets P of the processing conveyor 44. The processing conveyor 44 then carries the containers through the water in the preheating hydrostatic chamber 34.

The water in the preheating hydrostatic chamber 34 is heated and thermostatically controlled at even intervals thereof by injecting steam therein from the steam manifold 113. The temperature of the water at the inlet end of the preheating leg 34 is maintained at approximately 140° F. to 160° F. and gradually increases to 200° F. at the upper end thereof.

After the containers have moved through the water in the preheating housing 34, they are advanced through the 250° F. steam in the horizontal sterilizing chamber 32 thereby sterilizing the contents of the containers. The rows of containers then enter and pass through the cooling water in the hydrostatic cooling housing 36.

Cold water is directed into the hydrostatic cooling housing 36 from the conduit 112 and heated water in the housing 36 is drained therefrom at spaced intervals along the chamber by the manifold 114 thereby maintaining the temperature of the water in the upper end of the hydrostatic cooling housing 36 at approximately 200° F. and gradually reducing the temperature to approximately 105° F. at the low or discharge end of the hydrostatic cooling chamber 36. If desired, additional cooling may be obtained by spraying cold water on the containers as the containers move upwardly between the wall 84 and the partition 106 of the air chamber 38.

The rows of processed containers C are then advanced through the air chamber 38 and gravitate into the pockets 126a (FIG. 2) of the rotary discharge valve 46 which discharges the containers onto the discharge conveyor 176.

An important feature of the invention is that the processing pressures and temperatures used in the hydrostatic cooker 28 may be easily changed without requiring any mechanical alterations to the apparatus. Thus, if it is desired to sterilize containers in steam at approximately 275° F. and 31 p.s.i. gauge while retaining unbalanced water columns in the hydrostatic chambers that exert 5 p.s.i. gauge pressures, all that is necessary is that the pressure within the air chamber be retained at approximately 36 p.s.i. gauge. If the containers are glass jars, the temperature of the water in the preheating chamber 34 and in the cooling chamber 36 should be retained at temperatures which will cause the temperature differential between the treatment medium and the container to be less than about 60° F. to 70° F. at all times during the travel of the containers through the cooker thereby preventing abnormal glass breakage.

If vacuum packed cans are being handled, it may be desirable to reduce the overriding air pressure acting on the cans to prevent the possibility of paneling of the cans. The pressure within the air chamber 38 may be reduced thereby allowing the upper surfaces 116 and the lower surfaces 118 of the unbalanced water columns in the hydrostatic chambers to more nearly approach each other.

The hydrostatic cooker 200 (FIG. 5) of the second embodiment of the invention is in many respects quite similar to the hydrostatic cooker 28 of the first embodiment of the invention. Therefore, parts of the cooker 200 which are equivalent to those of the cooker 28 will be assigned the same numerals followed by the letter "b," and only those parts which are different from the first embodiment will be mentioned in detail.

The cooker 200 utilizes hot water as the cooking or sterilizing medium which, when processing glass containers filled with baby food, may be maintained at approximately 250° F. Air at a pressure of approxmiately 15 p.s.i. gauge is introduced into airlocks 100b and 102b through valved conduits 202 and 204, respectively. In order to accommodate a continuously driven bucket type discharge conveyor 206 which receives the processed rows of containers from the discharge valve 46b and conveys the series of rows transversely of their longitudinal axes away from the valve 46b, the U-shaped portion 208 of the hydrostatic housing 36b and the partition 106b are foreshortened. This distance between the upper water level 116b and the lower water level 118b in both housings 34b and 36b is less than in the first embodiment of the invention, this distance may be on the order of 5 feet representing an unbalanced force of approximately 2 p.s.i. Thus, the air pressure within the air chamber 38b must be maintained at approximately 17 p.s.i. gauge. If a larger overriding air pressure is required in order to firmly hold the caps on the glass containers being processed, the air pressure in the air locks 100b and 102b and the air pressure in the chamber 38b may be raised accordingly. It will also be appreciated that the inlet hydrostatic housing 34b and the partition 105b may be foreshortened in a manner similar to the outlet hydrostatic chamber 36b and the partition 106b in order to accommodate a feed conveyor which is similar to the discharge conveyor 206.

The hydrostatic cooker 210 (FIGS. 6 and 7) of the third embodiment of the invention is adapted to handle double rows of containers and is quite similar to the first embodiment of the invention. Accordingly, parts of the cooker 210 which are similar to the cooker 28 will be assigned the same numbers followed by the letter "c." The processing mediums and temperatures and pressures employed may be the same as those used in the hydrostatic cooker 28 of the first embodiment of the invention.

The conveyor 44c of the hydrostatic cooker 210 has a plurality of equally spaced, double pocketed carrier bars 212 with each carrier bar being divided into an outer pocket Pc and an inner boxed Pc'. Rows of containers are fed into the outer pockets Pc through the rotary inlet valve 40c as the pockets Pc move around a pair of sprockets 212 that are keyed to a shaft 214 journalled in the side walls of air chamber 38c which, in this embodiment of the invention is of generally U-shape. Containers are fed into the inner pockets Pc' through an inlet valve 40c' as the pockets Pc' are moved around the curved periphery of a pair of sprockets 216 keyed to a shaft 218 journalled in the housing of the air chamber 38c. After the containers have been processed, the containers in the inner pockets Pc' gravitate into a rotary discharge valve 46c' when the pockets Pc' are opened in response to moving around the periphery of a pair of sprockets 220. The sprockets 220 are keyed to a shaft 22 journalled in the side walls of the housing 38c. Similarly, the rows of containers in the outer pockets Pc gravitate into the rotary discharge valve 46c when the pockets Pc are opened as they move around a pair of sprockets 224 keyed to a shaft 226 journalled in the side walls of the housing 38c.

The conveyor 44c and the feed and discharge valves are continuously driven by a motor 230 bolted to the housing 38c. A pinion 232 keyed on the drive shaft 234 of the motor 230 meshes with a large diameter gear 236 keyed to the shaft 214 thereby driving the conveyor 44c in the direction indicated by the arrows in FIGURES 6 and 7. The rotor 124c of the rotary pressure feed valve 40c is driven from the motor drive shaft 234 by a chain drive 238. The rotor 124c' of the feed valve 40c' is driven by a chain drive 240 interconnecting the shaft 214 with the shaft 127c' of the rotor 124c'. The rotor of the discharge valve 46c' is driven from the shaft 226 by a chain drive 242, while the rotor of the discharge valve 46c is driven from the shaft 222 by a chain drive 244.

In addition to providing a hydrostatic cooker adapted to handle a double row of containers in each carrier 212, alternate positions of the inlet housing 34c (FIG. 6) and the outlet housing 36c are illustrated in phantom lines in FIGURE 5. Thus, if vacuum packed cans are being processed, very little preheating is required and accordingly the U-shaped portion of the inlet hydrostatic housing 34c may be moved to the phantom line position thereby reducing the length of the horizontal portion of the housing 34c. Similarly, if less cooling is required the U-shaped portion of the cooling housing 36c may be moved to the phantom line position thereby shortening the horizontal portion of the cooling housing 36c.

All the embodiments of the invention thus far described have illustrated cookers wherein the carriers of the processing conveyors were of the non-agitating type. The hydrostatic cooker 250 (FIG. 8) of the fourth embodiment of the invention is provided with a processing conveyor 44d having carriers 252 which are arranged to agitate the containers as the containers are moved through the several processing chambers in the cooker. Since the conveyor 44d of the hydrostatic cooker 250 (FIG. 8) may be operated within the pressurized housing 30 (FIG. 1) disclosed in the first embodiment of the invention with only minor changes made therein, only the carrier feed and discharge systems for the agitating cooker 250, which systems are disposed within the air chamber 38d, will be illustrated and described. Parts of the agitating cooker 250 which are equivalent to parts of the hydrostatic cooker of the first embodiment of the invention will be assigned the same numerals followed by the letter "d."

Each agitating carrier 252 (FIGS. 8, 9 and 12) comprises a cylindrical drum 254 having an elongated opening 255 in the periphery thereof for receiving and discharging containers therefrom. The drum 254 includes annular end plates 256 and 258 having tubular stub shafts 260 and 262 welded thereto and concentric with the drum. The tubular shafts 260 and 262 are pivotally received within bushings 263 which interconnect cooperating links 264 and 266 of the chains of conveyor 44d. An elongated agitating rotor shaft 268 is journalled in the tubular stub shafts 260 and 262 and has an agitating rotor 270 keyed thereon. As indicated in FIGURES 8 and 9 the rotor 270 includes a cylindrical base 272 having a plurality of equally spaced vanes 274 projecting outwardly therefrom and defining container receiving pockets P1–P6 therebetween. The shaft 268 projects outwardly from the tubular shaft 260 and has a star gear 276 and a pinion 278 keyed thereon.

The star gear 276 cooperates with a plurality of vertically spaced pins 280 which are secured to the wall 50d and project into the path of movement of the star gear 276 so as to progressively shift each pocket P1–P6 of the agitating rotor 270 into alignment with the elongated opening 255 of the drum 254 as the carrier is moved into feed stations FS1–FS6, respectively.

In order to rotate the carriers 252 as they move through the several chambers in the processing housing 30d, the pinion 278 rides along a rack 282 (only fragments being shown in FIGURES 8, 9 and 16) that is secured to the side wall 50d by brackets 284. The rack 282 is constructed of several sections and is placed below the pinions 278 along the horizontal runs of the conveyor 44d so as to maintain the conveyor runs horizontal while at the same time causing the rotor 270 to rotate thereby agitating the contents of the containers in the carriers.

The other end of each carrier is guided through the several chambers in the housing 30d by a roller 287 which rides in a channel guide track 288 (FIGS. 9, 10, 11, 13, 14 and 15) having an outer wall 290 and an inner wall 292. The track 288 is continuous except for the area adjacent the sprockets which control the movement of the conveyor 44d. A cam 294 having a drum closing lobe 296 and a drum opening lobe 298 is keyed to the tubular shaft 262. As illustrated in FIGURES 11 and 14, the drum opening lobe 298 is guided by the walls 290 and 292 of the track 288 when the carriers are moving past the feed station. During this time, the drum closing lobe 296 projects through a slot 300 in the wall 292. As the carriers leave the uppermost feed station FS–6, the drum closing lobe 296 engages an outwardly flared portion 302 of the wall 292 thereby shifting the drum so that its opening 255 is adjacent to and is closed by the outer surface of the next adjacent carrier. At the same time the lobe 296 is pivoted into position to be guided between the walls 288 and 299 while the drum opening lobe 298 projects outwardly of the wall 290 past the edge 304 (FIG. 14) of a foreshortened portion thereof. The carrier drum 254 is held in the closed position by the drum closing lobe 296 until the carrier is moved to the discharge station at which time the outwardly projecting drum opening lobe 298 engages an outwardly flared portion 306 of the wall 290 and is guided between the walls 290 and 292 while forcing the cam closing lobe through a slot 307 (FIG. 15) in the wall 292. The drums 254 is held in the opened position by the lobe 296 until the carrier 252 has been moved past carrier discharge stations DS–1 to DS–6 and remains open until after the carrier again moves past the feed stations FS–1 to FS–6 to start another cycle of operation. While each carrier is being moved past the discharge stations DS–1 to DS–6, the associated star gear 276 engages pins 308 causing progressive ones of the pockets, for example pockets P1–P6, to discharge their contents at discharge stations DS–1 to DS–6.

In order to feed rows of containers into the carriers 252, a feed mechanism 309 (FIG. 8) is provided which mechanism includes the feed conveyor 120d and the rotary pressure feed valve 40d. Rows of containers are deflected from the feed conveyor 120d by the pusher 122d into the pockets of the rotary feed valve 40d. The rows of containers are discharged from the valve 40d into elevator carriers 310 which are secured at evenly spaced intervals on an endless vertically extending feed elevator 312 which is driven in the directions indicated by arrows in FIGURE 8 and at a speed six times faster than that of the conveyor 44d.

The feed elevator 312 comprises a pair of spaced parallel endless chains 314 (only one being shown in FIG. 8) trained around pairs of upper sprockets 316 and pairs of lower sprockets 318. The upper sprockets 316 are keyed to a shaft 320 and the lower sprockets 318 are keyed to a shaft 321 which shafts are journalled in the side walls of the air chamber housing 38d.

Each elevator carrier 310 comprises a pair of spaced trough like supporting members which include a leading member 322 and a trailing member 324. The members 322 and 324 are secured to corresponding links of the chains 314 which maintain the members in horizontal and parallel relation. The rows of containers discharged from the valve 40d are received in the leading members 322 and are guided around the lower sprockets 318 by curved tracks 328 and 330 which are rigidly secured to the side walls of the air chamber 38d. As the carriers move around the lower sprockets 318, the rows of containers are transferred to the trailing members 324 and are moved upwardly until they are aligned with the openings 255 in the drums 254 of associated ones of the agitating carriers 252. Each row of containers disposed in feed stations FS–1 to FS–6 is then deflected from the continuously moving trailing member 324 into pockets P1 to P6, respectively, of the continuously moving associated carriers 252 by hydraulic pusher cylinders 332. Each cylinder is provided with an elongated pusher bar 333 on the associated piston rod 334 which pushes the associated row of containers into the associated pockets. The cylinders 332 are mounted on brackets 335 secured to the side walls of the air chamber 38d.

After the rows of containers have been processed, the drums 254 are shifted so that the openings 255 therein are opened and face elevator carriers 336 on the downwardly moving run of a discharge elevator 337. The elevator 337 comprises a pair of spaced parallel endless chains 338 trained around pairs of upper sprockets 340 and pairs of lower sprockets 342. The upper sprockets 340 are keyed to a shaft 344, and the lower sprockets are keyed to a shaft 345, which shafts are journalled in the side walls of the housing of the air chamber 38d. The elevator carriers 336 comprise a leading container supporting member 346 and a trailing member 348 which members are secured to corresponding links of the endless chains 338. As each agitating carrier enters each discharge station DS–1 to DS–6, the agitating rotor 252 is rotated 60° to move a row of containers into position to be discharged from the agitating carrier into the leading support member 346 of the associated elevator carrier 336. It will be understood that six rows of containers are simultaneously discharged from the six agitating carriers located at the discharge stations DS–1 to DS–6 and that the next six rows of containers will not be discharged from the agitating carriers until the six loaded elevator carriers 336 have moved downwardly past the lowest discharge station and six agitating carriers move downwardly one discharge station with the elongated openings in alignment with associated ones of the empty carriers 336 that have moved into the discharge stations.

In order to provide for a more gentle transfer of containers from the agitating carriers 252 to the elevator carriers 336, an inclined hydraulic discharge cylinder 352 is provided at each discharge station and each cylinder is secured to the walls of the air chamber 38d by a bracket 353. An elongated pusher plate 354 is secured to the end of the piston rod 356 of each cylinder and is moved outwardly into arresting position shown in dotted lines in FIGURE 8 to engage the row of containers immediately prior to their release from the associated agitating carriers 252. The piston rods 356 of each cylinder are then retracted to gently lower the rows of containers into the leading members of the associated elevator carriers 336. The rows of containers are then transferred into the rotary discharge valve 46d for discharge from the cooker 250 onto the discharge conveyor 176d.

The processing conveyor 44d is driven from a motor 358 by a gear drive 360 which includes a pinion 362 keyed to the motor drive shaft 364 which pinion meshes with a large diameter gear 366 keyed to the conveyor drive shaft 173d. The feed elevator 312 is driven by a chain drive 368 interconnecting the shaft 321 with the motor drive shaft 364. Similarly, the discharge elevator 337 is driven by a chain drive 369 which interconnects the motor drive shaft 364 with the shaft 345. The motor of the feed valve 40d is driven by a chain drive 370 which interconnects the rotor shaft 127d with the processing conveyor shaft 173d, and similarly, the rotor of the discharge pressure valve 46d is driven from the shaft 173d by a chain drive 372.

The hydraulic pusher cylinders 332 and discharge cylinders 352 are controlled by a hydraulic system 376 which is diagrammatically illustrated in FIGURE 17. The hydraulic system 376 comprises a hydraulic pump 378 which is driven by a motor 380 through a belt drive 382. The pump receives hydraulic fluid from a sump 383 and discharges the fluid through a high pressure manifold 384 to a cam operated valve 386.

The valve 386 comprises a shiftable core 388 which is slidably received in a housing 390 and is urged toward the right (FIG. 17) by a spring 392. Spaced pins 394 are secured to the large diameter gear 366 that is keyed to the processing conveyor drive shaft 173d and engage a sloping cam plate 396 formed on the outer end of a valve core stem 397 each time the agitating carriers 252 (FIG. 8) move into the six feed and discharge stations thereby momentarily shifting the core 388 out of the normal position shown in FIGURE 17. When the core 388 is positioned as illustrated in FIGURE 17, high pressure fluid flows through a passage 398 into main conduits 400 and 402. The conduit 400 is connected by branch conduits 404 to the stem ends of the pusher cylinders 332 thereby holding the piston rods 334 retracted. Similarly, the conduit 402 is connected by branch conduits 406 to the stem ends of the discharge cylinders 352 and holds the piston rods 356 retracted. Fluid is discharged from the closed ends of the cylinders 332 through branch conduits 407 connected to a main conduit 408. The main conduit directs the fluid through a passage 410 in the core 388 of the valve 386 for return to the sump 383 through a return manifold 412. Similarly, fluid discharged from the closed ends of the discharge cylinders 352 is returned to the sump 383 through branch conduits 414 which are connected to a conduit 416 that is connected to conduit 408 by a pipe fitting 418. Speed control valves 420 may be provided in each branch conduit 414 so as to control the rate of movement of the piston rods 356 of the discharge cylinders 352.

Each time the core 388 of the valve 386 is momentarily shifted by the pins 394, a straight passage 422 is moved into communicating engagement with the manifold 384 and with the main conduits 408 and 416, and another straight passage 424 is moved into communication with the return manifold 412 and the conduits 400 and 402. Thus, when the agitating carriers 252 are moved into the feed and discharge stations and the core is momentarily shifted by the pins 394, the piston rods 334 and 356 are extended, and shortly thereafter are again retracted, thereby feeding rows of containers into the carriers 252 at the feed stations FS–1 through FS–6, and control the discharge of containers from the carriers 252 at the discharge stations DS–1 through DS–6.

A modified feed mechanism 425 is illustrated in FIGURE 18 and may be used in place of the feed mechanism 309 (FIG. 8) for feeding articles into the agitating carriers 252e. All portions of the modified feed mechanism 425 are identical to the mechanism 309 except that the hydraulic pusher cylinders 332 are replaced by mechanically driven pusher fingers 426 thereby obviating the need for a hydraulic system. It will also be understood that similar mechanically driven let down fingers (not shown) may replace the hydraulic discharge cylinders 352. The parts of the feed mechanism 425 which are identical to those of the mechanism 309 will be assigned the same numerals followed by the letter "e," and only those parts of the two feed mechanisms which differ will be described in detail.

As indicated in FIGURES 18 and 19, six groups of spaced fingers 426 are rigidly secured to shafts 427 at feed stations FS–1 to FS–6. Each group of spaced fingers extend the full length of the associated shaft 427 and each shaft is rotatably journalled in the side walls of the air chamber housing 38e. The inner edges of each leading carrier members 322e and the trailing carrier members 324e are provided with slots 428 so as to permit the spaced fingers 426 to pass therethrough. The upper end of the curved track 328e is also slotted to accommodate the fingers 426. The shafts 427 are rotated one revolution each time one of the agitating carriers 252e moves upward a distance equal to the spacing between stations so that six rows of containers can simultaneously be deflected off the elevator carriers 310e and into the associated agitating carrier 252e. The shafts 427 are driven in a counterclockwise direction by an endless chain 429 trained around a drive sprocket 430 secured to the shaft 321e, and around driven sprockets 431 keyed to each of the shafts 427.

FIGURE 18A illustrates a modified embodiment of the invention wherein agitating carriers 252f are spaced from each other and have partition members 433 disposed therebetween and rigidly secured to the links of the processing conveyor. The partition members have arcuate faces 435 disposed adjacent the carriers 252f which serve to close the openings 255f when the carriers are positioned as illustrated in FIGURE 18A. In all other respects, the carriers 252f are the same as the carriers 252.

It has been determined that severe end-to-end contact between glass jars having certain types of covers sealed thereon is not desirable since such contact is apt to cause leakage of the caps. Accordingly, an alternate feed mechanism 432 (FIGS. 20–24) and an alternate discharge mechanism 434 (FIGS. 25–30) may be provided for preventing such severe end-to-end contact between the containers. It will be understood that the alternate feed mechanism 432 may be used to feed rows of containers into the above described rotary feed valves 40 of any of the above described cookers 28, and that the alternate discharge mechanism 434 may be used for receiving processed containers from the above described rotary discharge valves 46 of any of the cookers described herein.

The alternate feed mechanism 432 (FIGS. 20 and 21) comprises an endless conveyor 436 which is trained around a drive roller 438 and a driven roller 440. The drive roller 438 and driven roller 440 are keyed to shafts 442 and 444 which are journalled in side walls 446 and 448 of a frame 450. The conveyor 436 is continuously driven by a motor 452 which is supported by the frame 450 and has a drive shaft 454 connected to the shaft 442 by a chain drive 456. A single row of upstanding containers are directed onto the conveyor 436 and is divided into a plurality of lanes 457, eight lanes being illustrated in FIGURE 20. The division is accomplished by a plurality of cooperating dividing heads 458 and associated guide rails 460. Each dividing head 458 includes a pair of cooperating rotors 466 and 468 which are secured to vertical shafts 470 and 472 that are freely journalled in transversely extending support bars 474 of the frame 450, which bars extend over the upper run of the conveyor 436 in position to support the rotors in the path of movement of the single line of containers. Each rotor comprises a pair of opposed lobes 476 having outer peripheries in the form of circular segments with opposed V-shaped recesses 478 disposed therebetween. The lobes 476 of each pair of cooperating rotors 466 and 468 are maintained 180° out of phase from each other by being interconnected by a cross shaft 480 and meshing pairs of bevel gears 482, 484 and 486, 488. The bevel gears 482 and 484 are secured to opposite ends of the cross shaft 480 and mesh with the gears 486 and 488, respectively, which are secured to the shafts 470 and 472, respectively. Thus, each single lane of containers entering one of the dividing heads 458 will cause the rotors 466 and 468 to rotate thereby shifting alternate ones of the containers in opposite directions with the result that each single lane is separated into two lanes as clearing indicated in FIGURE 20.

In order to assure that complete, transversely extending rows of eight containers each will be fed into the carrier bars of the associated cookers, a container detecting device 490 and a cooperating transfer device 492 are provided for transferring only complete rows of containers from the discharge end of the conveyor 436 into the cooker.

The container detecting device 490 (FIGS. 20, 21, and 23) comprises a shaft 494 which is secured to the frame 450 by brackets 493 and extends transversely over a dead plate 495 secured to the frame 450 and arranged to receive the containers from the discharge end of the conveyor 436. A plurality of independent, vertically extending arms 496 are freely journalled on the shaft 494 intermediate the ends thereof, and each arm 496 is disposed in alignment with an associate one of the lines 457. A resilient container engaging finger 498 (FIG. 23) is secured to the lower end of each arm 496 and is arranged to be contacted by a container in its associated lane when the container is moving into position to be received by the transfer device 492. When the container is moving into transfer position, the engagement between the container and the finger 498 causes the arm 496 to pivot in a counterclockwise direction (FIG. 23) thereby moving a plate 500 from a position wherein it interrupts a beam of light directed toward a photoelectric cell 502 (FIG. 20) from a lamp 504, to a position spaced from beam of light. If a container is not present at the transfer position in any one of the lanes 457, gravity will hold the associated plate 500 in the beam interrupting position thereby preventing the light beam from activating the photoelectric cell 502 until such time as the container enters the transfer position and pivots the plate away from the beam of light.

Spaced transversely extending stop bars 505 are secured to the brackets 493 to limit the pivotal movement of the beam interrupting plates. Thus, in order to activate the transfer device 492, which device is actuated in response to a signal received from the photoelectric cell 502, as will be described hereinafter, a container must first be moved into transfer position in each and every lane so as to move all of the plates 500 out of the beam interrupting position.

The transfer device 492 (FIGS. 22 and 23) comprises a plurality of conical fingers 506 which are secured to the periphery of a drum 507 to define nine star wheels 508. The drum 507 is keyed to a shaft 509 that is journalled in the side walls 446 and 448 of the frame 450. The star wheels 508 are spaced from each other so that an adjacent pair of wheels 508 engages each container, separates the containers from the next adjacent container in the same lane, and moves each container into a container twister 510. Each pair of star wheels 508 is spaced a sufficient distance from each other so as to engage the associated container in planes spaced outwardly from the central axis of the container. It will be noted that when the points 511 of the conical fingers 506 of a pair of star wheels 508 move into engagement with a container, that these points 511 first pass through slots 516 formed in the discharge end of the dead plate 495 and thereafter enter the space defined between the four adjacent containers. The star wheels 508 are rotated in 60° increments by drive means soon to be described. Because of the conical shape of each finger 506 and the cylindrical shape of the containers, during each 60° of rotation of each pair of star wheels 508 a row of containers remains upright while being moved from the dead plate 495 into the container twister 510. This operation is repeated for each complete row of containers formed on the dead plate 495.

The article twisters 510, one being provided for each lane 457 of containers, are of standard well known design and comprise a plurality of twisted bars 520 which are welded to generally rectangular frames 522 so as to define a rectangular passageway which is twisted 90° and conforms to the size and shape of the containers being handled. The containers are pushed into the passageways of the twisters 510 by the star wheels 508 of the transfer device 492 and each container twists from a position wherein its longitudinal axis is vertical to a position wherein its axis is horizontal while gravitating through the twister 510. The twisters 510 are supported, as by welding, to a slotted, transversely extending member 524 (FIG. 21) of the frame 450.

As indicated in FIGURES 20 and 21, the twisters 510 deposit the rows of spaced containers with their axes horizontal into pockets 526 of a transfer rotor 528. The rotor 528 includes a cylindrical housing 530 having an elongated inlet opening 532 in alignment with the outlet of the twisters 510, and an elongated discharge opening 534 which registers with the inlet opening 130 of the rotary pressure feed valve 40. A drum 536 is secured to a rotor shaft 538 which is journalled in end walls 540 of the housing 530 and is concentric therewith. A plurality of equally spaced radially extending bars 542 are welded to the periphery of the drum 536 and define the pockets 526. The shaft 538 is continuously driven in timed relation with the rotor 124 of the feed valve 40 by a drive gear 544 (FIG. 20) which is keyed to the shaft 127 of the rotor 124 and by a driven gear 546 which meshes with the gear 544 and is keyed to the shaft 538. The shaft 127 is driven from the motor 182 through the chain drive 190 as previously described.

It will be apparent that the transfer device 492 must be actuated in timed relation with the movement of the transfer rotor 528 and, as mentioned previously, will only be actuated when a complete row of containers has been moved into the transfer position thereby pivoting all of the plates 500 out of the light beam to the photoelectric cell 502.

As indicated diagrammatically in FIGURE 24, the transfer device 492 is intermittently driven by a solenoid 550. The solenoid 550 has its actuating element 552 pivotally connected to one end of a link 554 which has its other end pivotally connected to a pawl arm 556. The pawl arm is pivotally mounted on the shaft 509 adjacent the ratchet wheel 558 which is keyed to the shaft 509, and has a pawl 560 pivotally connected thereto. A leaf spring 562 is bolted to the arm 556 and urges the pawl into engagement with the ratchet teeth. Thus, each actuation of the solenoid 550 will cause the shaft 509 to rotate 60° thereby moving a row of containers into the twisters 510 for gravitation into an empty pocket 526 of the transfer rotor 528.

A timing circuit 564 is provided to assure that the solenoid 550 will be actuated only when a full row of containers are in position to be transfered and only when a pocket 526 of the transfer rotor 528 is in position to receive a row of transferred articles. The circuit 564 receives electrical power from main lines L1 and L2. The photoelectric cell 502 includes a switch contact 566 which opens circuit 564 when the light beam to the cell 502 is interrupted by any of the plates 500. When all plates 500 are in the position illustrated in FIGURE 23, the light beam energizes the cell 502 thereby closing switch contact 566. A normally open timing switch 568 is in series with switch contact 566 and is contacted and closed by six equally spaced lobes 570 of a cam 571 which are secured to one face of the gear 546 and are disposed in position to be engaged by the timing switch 568 when the pockets 526 move into loading position. Thus, each time the timing switch 568 and the photoelectric cell contact 502 are both closed, the solenoid 550 is energized thereby causing the transfer device to rotate 60° moving a complete row of containers into the twisters 510, which containers gravitate through the twister and are received in the empty pockets 526 of the transfer rotor 528.

After the containers have been processed and have been received by the rotary discharge pressure valve 46 (FIGS. 25 and 26) of the hydrostatic cooker 28, they are discharged from the valve 46 onto a container receiving plate 555 of a discharge mechanism 557. The discharge mechanism 557, like the feed mechanism 432, is arranged to provide very little force against the container caps. The plate 555 is supported by a frame 559 and has a diagonal depression 561 in its upper surface terminating in a roller and belt receiving opening 563. An endless diagonal conveyor 565 has its upper run received in the depression 561 and is trained around an idler roller 567 and a drive roller 569 journalled on the frame 559 and connected to a motor 572 by a chain drive 573. The motor is connected to a table 574 which is rigidly secured to the frame 559 and drives the upper run of the conveyor 565 in the direction of the arrow X in FIGURE 25.

When the containers are deposited on the plate 555 from the valve 46 they are deposited between bars 576 of a transport conveyor 578. The transport conveyor 578 includes a pair of spaced endless chains 580 to which the bars 576 are journalled. The chains are trained around drive sprockets 582 which are secured to a drive shaft 584, and around driven sprockets 586 which are secured to stub shafts 588. The shafts 584 and 588 are journalled in bearings 590 secured to the frame 559, and the drive shaft 584 is driven from the shaft 127a by meshing gears 592 and 594 which are keyed to the shafts 127a and 584, respectively. Thus, the transport conveyor drives the containers in the direction of the arrow Y in FIGURES 25 and 26. When the containers are pushed onto the diagonal conveyor 565, the containers are gently moved together with the end container being pushed against a rail 596 as clearly indicated in FIGURE 25. The rail 596 is secured by brackets 598 to the frame 559.

The containers are then advanced into the inlet end of an article separating discharge chute 600 (FIGS. 25, 26 and 27). The chute 600 is divided into a plurality of channel guideways 602, eight guideways being shown in FIGURE 25, by a plurality of vertical walls 604. Alternate guideways 602a have steeply inclined floors 606 while the other guideway 602b have shallower inclined floors 608. In order to reliably guide the containers into the guideways, a bar 610 is secured to the upper end of each wall 604 and has its forward deflecting end 612 angled over the associated steeply inclined floor 606 in position to permit the container on said steep floor 606 to roll under said forward end 612 without contacting the same. However, any containers on the shallow floors 608 which are not aligned with the associated guideway 602b will contact the forward end 612 of the associated bar 610 and will be deflected into alignment with the associated guideway 602b.

The containers in each guideway 602a roll into and through a container twister 614 which shifts the containers so that their axes move from a horizontal to a vertical position and deposit the containers, one at a time, on a take-away conveyor 616, or the like, with the container closing cap uppermost. Similarly, the containers in the guideways 602b roll into and through twisters 618 which twists the containers from a horizontal to a vertical position and deposits the containers onto the take-away conveyor 616.

A modified discharge mechanism 624 is illustrated in FIGURES 28, 29 and 30 and is provided as a substitute for a chute 600. Since the mechanism 624 is in many respects similar to the discharge mechanism 557, only the differences between the two discharge mechanisms will be described in detail, and parts of the mechanism 624 which are similar to those of the discharge mechanism 557 will be assigned the same numerals followed by the letter $x$.

As in the mechanism 557, the rows of containers are discharged from the rotary pressure valve 46 onto the plate 555x and are advanced therealong by the transport conveyor 578x. The diagonal conveyor 565x gently moves the containers into abutting contact against the rail 596x.

The containers are then advanced around the driven sprockets 586 into a lower run of the transport conveyor 578. While moving around the sprockets 586x, the containers are guided by an arcuate end portion 626 of a plate 628 which extends below the lower run and supports the containers. As best illustrated in FIGURE 29, alternate rows of the containers roll into openings 630 in the plate 628 and gravitate through twisters 632 (FIG. 30) which shift the containers from horizontal to vertical positions and deposits them onto the take-away conveyor 616. The remaining containers are advanced to the other end of the plate 628 by the transport conveyor 578 and gravitate off the ends thereof into twisters 634 which shift the containers from a horizontal to a vertical position and discharge the containers onto the take-away conveyor 616.

From the foregoing description it is apparent that the hydrostatic cooker of the present invention utilizes short hydrostatic water legs which have high pressure air acting on the lower ends thereof so as to provide the requisite pressure imparted to the external surfaces of the containers being processed. The cooker also includes horizontal water legs which may be varied in length as desired so as to alter the container preheating rate or cooling rate as required by the product being processed or by the type of container being processed. The containers being carried through the cooker may be supported in either agitating or non-agitating carriers with suitable feed means being provided for both types of carriers. Also, feed and discharge means are provided for gently handling capped glass jars so that the caps are not subjected to abutting forces which would tend to cause leakage to occur between the caps and the jars.

While one embodiment of the present invention has been shown and described, it will be understood that other changes and modifications may be made therein without departing from the spirit of the invention for the scope of the amended claims.

Having thus described the present invention and the manner in which the same is to be used, what is claimed as new and desired to be protected by Letters Patent is:

1. A heat treatment apparatus comprising means defining a sterilizing pressure chamber, means defining a U-shaped inlet hydrostatic housing with one end of said housing communicating with one end of said pressure chamber, means defining a U-shaped outlet hydrostatic housing with one end of said outlet housing communicating with the other end of said pressure chamber, means for directing a high pressure heating medium into said pressure chamber, means for directing a liquid preheating medium into said U-shaped inlet housing, means for directing a liquid cooling medium into said U-shaped outlet housing, means defining an air chamber for applying an overriding air pressure to the other ends of said housings, said air pressure being sufficient to maintain the level of liquid in each of said U-shaped housings at different elevations and to cooperate with the forces exerted by the so defined unbalanced portions of liquid to balance the pressure within said pressure chamber, and conveying means including carriers for supporting and moving articles into and through said U-shaped inlet housings, through said sterilizing pressure chamber, and through and out of said U-shaped outlet housing without disturbing the pressure balance within said housings.

2. A heat treatment apparatus comprising means defining a sterilizing chamber filled with a heating medium under pressure, a U-shaped hydrostatic inlet housing communicating with said sterilizing chamber and having a column of liquid therein with one end of the liquid communicating with the pressurized heating medium, a U-shaped hydrostatic outlet housing communicating with said sterilizing chamber and having a column of liquid therein with one end of the liquid communicating with the pressurized heating medium, means defining an air chamber communicating with the other ends of the liquid in said U-shaped inlet and outlet housings and having high pressure air therein maintained at a pressure sufficient to balance the pressure of said heating medium and the pressure exerted by uneven columns of liquid in said U-shaped housings, a continuously driven conveying means trained through said chambers and housings, a plurality of carriers on said conveyor, means for directing containers to be processed into said air chamber and into said carriers, and means in said air chamber for receiving processed containers from said carriers and for discharging the container from said air chamber.

3. An apparatus according to claim 1 wherein said high pressure heating medium is a mixture of steam and air.

4. An apparatus according to claim 1 wherein said heating medium is steam under pressure.

5. An apparatus according to claim 1 wherein said high pressure heating medium is a heated liquid and wherein said sterilizing pressure chamber includes means defining air pockets at both ends thereof which air pockets communicate with said one ends of said U-shaped hydrostatic housings, and means for directing air pressure into said housings.

6. An apparatus according to claim 1 wherein said heating medium is water and wherein said sterilizing chamber includes air locks disposed between the heating medium and the liquid in said U-shaped housings.

7. An apparatus according to claim 1 including elongated, horizontal sections in each of said U-shaped housings, means for gradually raising the temperature of the liquid in the inlet housing from a low temperature adjacent said air chamber to a high temperature adjacent said sterilizing chamber, and means for maintaining a gradually decreasing temperature gradient in said discharge housing from a high temperature adjacent the sterilizing chamber to a low temperature adjacent said air chamber, said temperature raising means and said temperature cooling means being regulated to hold the temperature differential between the heat treatment medium and the containers being processed to less than about 60° F. to 70° F.

8. An apparatus according to claim 2 wherein a plurality of agitating carriers are supported by said conveying means.

9. An apparatus according to claim 1 and including heat transfer means communicating with the liquid in said housings for providing a temperature gradient in the liquid in said housings with the highest temperature being adjacent said sterilizing chamber and the lowest temperature being adjacent said air chamber defining means.

10. An apparatus according to claim 9 wherein the highest temperatures are at the upper ends of said housings and wherein the lowest temperatures are at the lower ends of said housings.

11. A heat treatment apparatus comprising means defining a sterilizing chamber having an inlet and an outlet end, an inlet hydrostatic housing having an upper end and a lower end with the upper end communicating with said inlet end of said sterilizing chamber, an outlet hydrostatic housing having an upper end and a lower end with the upper end communicating with said outlet end of said sterilizing chamber, means defining U-tubes in the lower ends of said inlet and outlet housing, means defining an air chamber connected to the lower ends of said inlet and outlet housings, a continuously driven conveying means trained through said housings and said chambers and having a plurality of carriers thereon, said conveying means including means for directing containers into said carriers while in said air chamber from a point externally of said air chamber, means for directing a heated sterilizing medium into said sterilizing chamber and for maintaining said heating medium under pressure, means for directing water into said hydrostatic housings, means for directing high pressure air into said air chamber for exerting pressure on the lower ends of the water in said hydrostatic chambers sufficient to equalize the force exerted by the pressurized sterilizing medium and the force exerted by the unbalanced columns of water in the hydrostatic housings, said pressure being sufficient to prevent the differential between the pressure acting on the inside of the containers and on the outside of the containers from injuring the containers at any time during their travel through said chambers and housings.

12. An apparatus according to claim 11 wherein said conveying means includes a continuously driven rotary pressure feed valve for directing containers to be processed into said carriers while passing through said air chamber, and a continuously driven rotary pressure discharge valve for receiving processed containers from said carriers while passing through said air chamber for discharging the processed containers from the heat treatment apparatus.

13. An apparatus according to claim 11 wherein said carriers are agitating carriers, each agitating carrier comprising a cylindrical drum having an elongated inlet and discharge opening in the surface thereof, end plates secured to the ends of said drum, tubular shafts secured to the end plates with one shaft journalled in one of said chains and the other shaft journalled in the other chain, a radial shaft extending through and journalled in said tubular shafts, a reel secured to said reel shaft and having a plurality of container receiving pockets therein, means for guiding the chains along a predetermined path, drum actuating means secured to one of said tubular shafts and cooperating with said guide means for normally holding said elongated drum opening in closed position adjacent the periphery of the drum of another carrier and for shifting the opening away from said other carrier when the carrier enters a feed station and when the carrier enters a discharge station, means for intermittently rotating said reel when the carriers are in said feed and discharge stations for positioning each pocket in turn in alignment with said elongated opening for receiving and discharging containers from each pocket, and means for continuously rotating said reel while moving through portions of its travel through the treatment apparatus.

14. An apparatus according to claim 13 wherein a partition member is secured to said chains between the drums of each carrier, said partition member having an arcuate surface adapted to close said elongated drum openings when said guide means and said drum actuating means cooperate to move said drum opening to closed position.

15. An apparatus according to claim 13 wherein said chain guiding means includes a channel track for guiding one of the chains along a predetermined path, a double lobed cam secured to the tubular shaft adjacent said one chain and riding along spaced surfaces of said channel track for normally holding said elongated drum opening in closed position adjacent the periphery of the drum of another carrier and for shifting the opening away from said other carrier when the carrier enters a feed station and when the carrier enters a discharge station.

16. An apparatus according to claim 13 and additionally comprising a star wheel keyed to said reel shaft, a plurality of fixed pins secured to the housing in the path of movement of the star wheel for engaging said pins as the star wheels move therepast for positioning each pocket in turn in alignment with said elongated opening for receiving and discharging containers from each pocket, a pinion secured to one of said tubular shafts, and a rack secured to the housing in position to be engaged by the pinion for continuously rotating the reel while engaged with said rack.

17. An apparatus according to claim 11 wherein said carriers are agitating carriers, each agitating carrier including a reel having a plurality of pockets, a rotatable drum encompassing said reel and having an article transfer opening therein, a transfer conveyor having one run parallel to and adjacent said feed run, said openings in said agitating carriers being disposed adjacent said transfer conveyor when the agitating carriers move past said transfer conveyor, a plurality of carrier members on said transfer conveyor, a rotary pressure valve secured to said housing and having a plurality of pockets therein, means for directing containers between said pressure valve and said carrier members of said transfer conveyor, means for rotating said reel as the carriers move past the plurality of article transfer stations, pusher means for transferring the article between the carrier members and the radial pockets each time the carrier members and the reels are aligned at the transfer stations, and means for driving said processing conveyor, said transfer conveyor, said rotary pressure valve and said transferring means in timed relation.

18. An apparatus according to claim 17 and additionally including means for pivoting each of said drums to a position wherein said opening is closed by the periphery of the drum of the next adjacent carrier after the carrier has been moved out of said linear run.

19. An apparatus according to claim 17 and including means for rotating said reel as the carriers move past a plurality of article transfer stations, and hydraulically actuated pusher means for transferring the articles between the carrier members and reel pockets each time the carrier members and the reels are aligned at the transfer stations.

20. An apparatus according to claim 17 wherein said carrier members are slotted and wherein said pusher means comprise a pusher shaft at each transfer station extending transversely of said transfer conveyor and disposed adjacent said one run of said transfer conveyor, a slotted pusher secured to each pusher shaft and positioned to pass through the slots in said carrier member to engage and transfer the articles between the carrier members and the reel pockets each time the carrier members and reel pockets are aligned at the transfer station, and means for driving said pusher shaft in timed relation with said processing conveyor, transfer conveyor, and rotary pressure valve.

21. In a heat treatment apparatus according to claim 1 a feed mechanism for feeding rows of containers such as glass or plastic jars into the apparatus while minimizing end-to-end impact between the containers comprising, means for supporting a row of containers on one end and for advancing the row of containers along a predetermined path, means for dividing the containers into a plurality of paths for movement into transfer position at one end of said paths, transfer means at the transfer position for terminating the movement of the foremost container in each path, container twisting means for receiving the containers from said transfer means and for twisting the containers from a position wherein their axes are vertical to a position wherein their axes are horizontal, continuously driven conveying means in the heat treatment apparatus having pockets for receiving the rows of containers from said twisting means, means for detecting the presence of a complete row of containers in said transfer station, and means responsive to the detection of a complete row of containers in said transfer means and to the location of said pockets in position to receive a container for actuating the transfer means for transferring a row of containers into said pockets.

22. An apparatus according to claim 21 wherein said transfer means includes a rotary transfer drum journalled for rotation adjacent the discharge end of said supporting and advancing means, a plurality of rows of evenly spaced conical fingers secured to and projecting outwardly from said transfer drum, said rows of fingers defining star wheels, two of said star wheels being disposed on opposite sides of each container so as to cradle the container and remove it from the next adjacent container while holding the container upright during transfer into said twister.

23. An apparatus according to claim 21 wherein said detecting means includes a shaft disposed above said supporting means and extending transversely of said path, a plurality of arms pivoted on said shaft with one arm being provided for each path, a resilient container engaging finger disposed on the lower end of each arm in position to engage a container disposed in the transfer position of each path, a plate on the upper end of each finger, a photoelectric cell at one side of said path, and a light source at the other side of said path for directing a beam of light toward said photoelectric cell, said plates being disposed in said light beam to prevent energization of said photoelectric cell when a container in the associated path is absent from said transfer position, said plates being positioned out of said light beam when a complete row of containers is formed at said transfer station by a container moving into the transfer position in each path and engaging the associated resilient finger.

24. In a heat treatment apparatus according to claim 1, a discharge mechanism for discharging spaced rows of containers from the apparatus while minimizing end-to-end impact between the containers comprising, supporting means for receiving rows of containers with their axes horizontal, conveying means for advancing the rows of containers over said supporting means, guide means along one side of said supporting means, compacting means for gently urging the containers in each row together with the container at one end of each row contacting said guide means, a takeaway conveyor, and discharge means for twisting said containers from a horizontal to a vertical position and for discharging alternate ones of the containers on their ends in a first row on said take-away conveyor and for discharging the other containers on their ends in another row on said take-away conveyor.

25. An apparatus according to claim 24 wherein said conveying means and said compacting means comprises an endless conveyor having one run disposed over said supporting means, a plurality of spaced transversely extending rods on said conveyor in position to engage and move said containers over said supporting means when in said upper run, and an oblique conveyor having its upper run riding over said supporting means and driven in a direction to gently move the containers in each row into abutting engagement with one of said containers riding against said guide means.

26. An apparatus according to claim 24 wherein said discharge means comprises means defining an article separating and discharging chute, a plurality of spaced steeply sloping floors in said chute, a plurality of shallow sloping floors in said chute disposed between said steeply sloping floors, vertical walls disposed between each of said steeply sloping floors and shallow floors and extending upwardly, a deflecting rod secured to the upper end of each vertical wall and having an inlet end angled over the next adjacent steeply sloping floor in position to permit containers rolling on said steeply sloping floor to pass therebelow, said deflecting ends of said rods being adapted to engage containers and deflect the containers into alignment with said shallow floors for acceptance between said adjacent vertical walls, and independent means at the end of said each shallow floor and each steeply sloping floor for twisting said containers from a horizontal to a vertical position and for discharging the containers received from said steeply sloping floor on their ends in a first row on said take-away conveyor and for discharging the containers received from said shallow sloping floors on their ends in another row on said takeaway conveyor.

References Cited

UNITED STATES PATENTS

| 1,588,374 | 6/1926 | Johnson | 99—361 |
|---|---|---|---|
| 1,977,044 | 10/1934 | Charistie et al. | 99—362 |
| 2,569,645 | 10/1951 | Viall | 99—214 |
| 2,632,378 | 3/1953 | Carvallo | 99—361 |
| 2,719,478 | 10/1955 | Van Der Winden | 99—360 |
| 2,760,873 | 8/1956 | Munz | 99—214 |
| 2,968,232 | 1/1961 | Carvallo | 99—360 |
| 3,101,995 | 8/1963 | Beauvais | 21—78 |
| 3,211,275 | 10/1965 | Van Der Winden | 99—360 X |
| 3,252,405 | 5/1966 | Mencacci | 99—362 |
| 3,286,619 | 11/1966 | Lee | 99—363 |

BILLY J. WILHITE, *Primary Examiner.*